(12) United States Patent
Fiorani et al.

(10) Patent No.: US 11,240,701 B2
(45) Date of Patent: Feb. 1, 2022

(54) NOTIFICATION CONTROL OVER RAN INTERFACES

(71) Applicant: Telefonaktiebolaget LM Ericsson (publ), Stockholm (SE)

(72) Inventors: Matteo Fiorani, Solna (SE); Angelo Centonza, Stockholm (SE); Nianshan Shi, Järfälla (SE); Alexander Vesely, Feldbach (AT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/753,118

(22) PCT Filed: Nov. 12, 2018

(86) PCT No.: PCT/SE2018/051157
§ 371 (c)(1),
(2) Date: Apr. 2, 2020

(87) PCT Pub. No.: WO2019/098912
PCT Pub. Date: May 23, 2019

(65) Prior Publication Data
US 2020/0280872 A1 Sep. 3, 2020

Related U.S. Application Data

(60) Provisional application No. 62/587,949, filed on Nov. 17, 2017.

(51) Int. Cl.
*H04W 28/02* (2009.01)
*H04W 72/08* (2009.01)

(52) U.S. Cl.
CPC ..... *H04W 28/0268* (2013.01); *H04W 72/087* (2013.01)

(58) Field of Classification Search
CPC . H04W 28/00; H04W 28/02; H04W 28/0215; H04W 28/0231; H04W 28/0236;
(Continued)

(56) References Cited

U.S. PATENT DOCUMENTS 8,599,786 B2 * 12/2013 Backlund .......... H04W 36/0016
370/331
9,414,256 B2 8/2016 Ahmadi
(Continued)

FOREIGN PATENT DOCUMENTS

EP 2797359 B1 5/2017
EP 3241401 A1 11/2017
(Continued)

OTHER PUBLICATIONS

"3GPP TS 37.340 V1.1.1", 3rd Generation Partnership Project; Technical Specification Group Radio Access Network; Evolved Universal Terrestrial Radio Access (E-UTRA) and NR; Multi-connectivity; Stage 2 (Release 15), Oct. 2017, pp. 1-56.
(Continued)

*Primary Examiner* — Kevin D Mew
(74) *Attorney, Agent, or Firm* — Murphy, Bilak & Homiller, PLLC

(57) ABSTRACT

According to a first exemplary embodiment a method is performed by a first network node for monitoring the QoS of a flow. A session setup message comprising a QoS configuration for the flow and an indication that the flow is subject to QoS notification control is received (1710) from a core network node. Based on the QoS configuration, radio resources to be used for the flow are determined (1720) and a resource setup message comprising an identification of the radio resources and an indication that the flow and/or the radio resources are subject to QoS notification control is sent (1730) to a second network node. A first notification control
(Continued)

indication that the QoS configuration the flow and/or the radio resources cannot be fulfilled is received (1740) from the second network node and a resource notification message indicating that the QoS configuration for the flow cannot be fulfilled is sent (1750) to the core network node.

13 Claims, 15 Drawing Sheets

(58) Field of Classification Search
CPC ......... H04W 28/0242; H04W 28/0247; H04W 28/0257; H04W 28/0263; H04W 28/0268; H04W 28/08; H04W 72/048; H04W 72/0486; H04W 72/0493; H04W 72/082; H04W 72/085; H04W 72/087
See application file for complete search history.

(56) References Cited

U.S. PATENT DOCUMENTS

| | | | |
|---|---|---|---|
| 2004/0105446 | A1 | 6/2004 | Park et al. |
| 2007/0091801 | A1* | 4/2007 | Shahidi ............... H04L 47/15 370/230 |
| 2010/0074109 | A1 | 3/2010 | Klingenbrunn et al. |
| 2013/0308527 | A1* | 11/2013 | Chin ................... H04W 64/003 370/328 |
| 2014/0220983 | A1* | 8/2014 | Peng ................. H04W 36/0005 455/438 |
| 2014/0254559 | A1* | 9/2014 | Tie ....................... H04W 36/24 370/332 |
| 2015/0043531 | A1 | 2/2015 | Masini et al. |
| 2015/0172964 | A1* | 6/2015 | Huang ............. H04W 36/0033 455/437 |
| 2015/0237535 | A1* | 8/2015 | Aramoto ............... H04W 36/38 455/436 |
| 2016/0219464 | A1* | 7/2016 | Roeland ............ H04W 36/0022 |
| 2016/0353337 | A1* | 12/2016 | Zhu ................... H04W 36/0083 |
| 2017/0134128 | A1* | 5/2017 | Opshaug ............. G01S 5/0252 |
| 2017/0324652 | A1 | 11/2017 | Lee et al. |
| 2018/0091108 | A1* | 3/2018 | Zhao ................. H04W 52/0206 |
| 2018/0160348 | A1* | 6/2018 | Wu ....................... H04W 76/27 |
| 2019/0191348 | A1* | 6/2019 | Futaki .............. H04W 36/0033 |
| 2019/0313295 | A1* | 10/2019 | Xu ......................... H04W 36/08 |
| 2020/0015116 | A1* | 1/2020 | Huang .................. H04W 28/12 |
| 2020/0077317 | A1* | 3/2020 | Sharma ............. H04W 36/0027 |
| 2020/0154320 | A1* | 5/2020 | Xu ......................... H04W 28/02 |
| 2020/0396651 | A1 | 12/2020 | Wang et al. |
| 2021/0092661 | A1* | 3/2021 | Hu .................... H04W 28/0268 |

FOREIGN PATENT DOCUMENTS

| | | |
|---|---|---|
| JP | 2015520576 A | 7/2015 |
| JP | 2020511893 A | 4/2020 |
| RU | 2476029 C2 | 2/2013 |
| RU | 2595777 C2 | 8/2016 |
| WO | 2018171398 A1 | 9/2018 |

OTHER PUBLICATIONS

"3GPP TS 38.300 V0.6.0", 3rd Generation Partnership Project; Technical Specification Group Radio Access Network; NR; NR and NG-RAN Overall Description; Stage 2 (Release 15), Aug. 2017, pp. 1-59.

"3GPP TS 38.300 V1.2.0", 3rd Generation Partnership Project; Technical Specification Group Radio Access Network; NR; NR and NG-RAN Overall Description; Stage 2 (Release 15), Nov. 2017, pp. 1-60.

"Data Forwarding for QoS Flow Remapping During Mobility", 3GPP TSG-RAN WG3 #96; R3-171810; Hangzhou, P.R. China, May 15-19, 2017, pp. 1-4.

"3GPP TR 38.801 V1.2.0"; 3rd Generation Partnership Project; Technical Specification Group Radio Access Network; Study on New Radio Access Technology; Radio Access Architecture and Interfaces (Release 14), Feb. 2017, pp. 1-90.

"3GPP TS 33.401 V15.1.0"; 3rd Generation Partnership Project; Technical Specification Group Services and System Aspects; 3GPP System Architecture Evolution (SAE); Security architecture (Release 15), Sep. 2017, pp. 1-161.

"3GPP TS 23.501 V1.5.0"; 3rd Generation Partnership Project; Technical Specification Group Services and System Aspects; System Architecture for the 5G System; Stage 2 (Release 15), Nov. 2017, pp. 1-170.

"3GPP TS 38.401 V15.1.0"; 3rd Generation Partnership Project; Technical Specification Group Radio Access Network; NG-RAN; Architecture description (Release 15), Mar. 2018, pp. 1-23.

"Bearer Management over F1", 3GPP TSG-RAN3 Meeting #97, R3-173110, Berlin, Germany, Aug. 21-25, 2017, pp. 1-3.

"Discussion on Notification Control", 3GPP TSG-RAN WG3 #97bis, R3-173616, Prague, Czech Republic, Oct. 9-13, 2017, pp. 1-2.

* cited by examiner

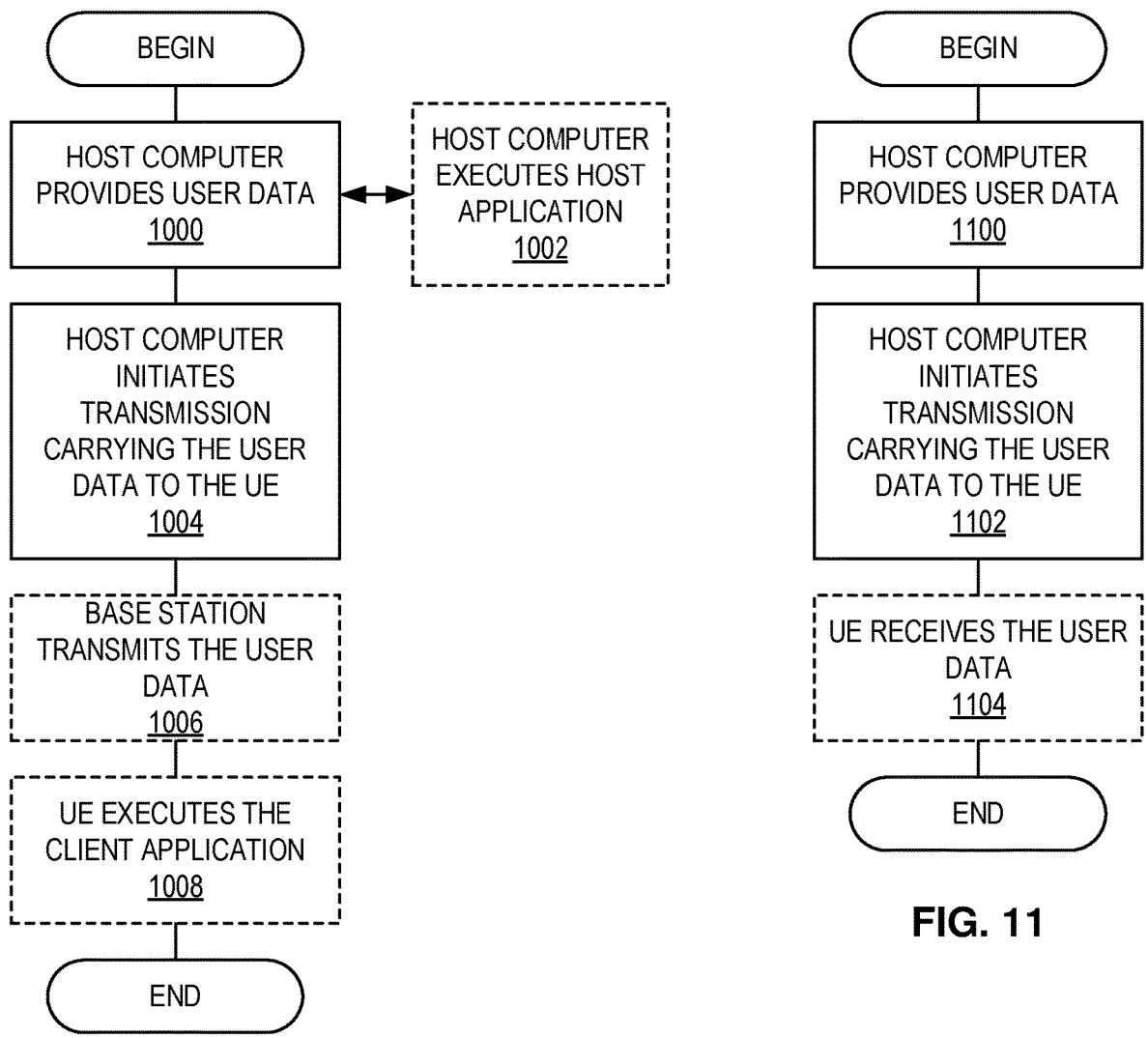

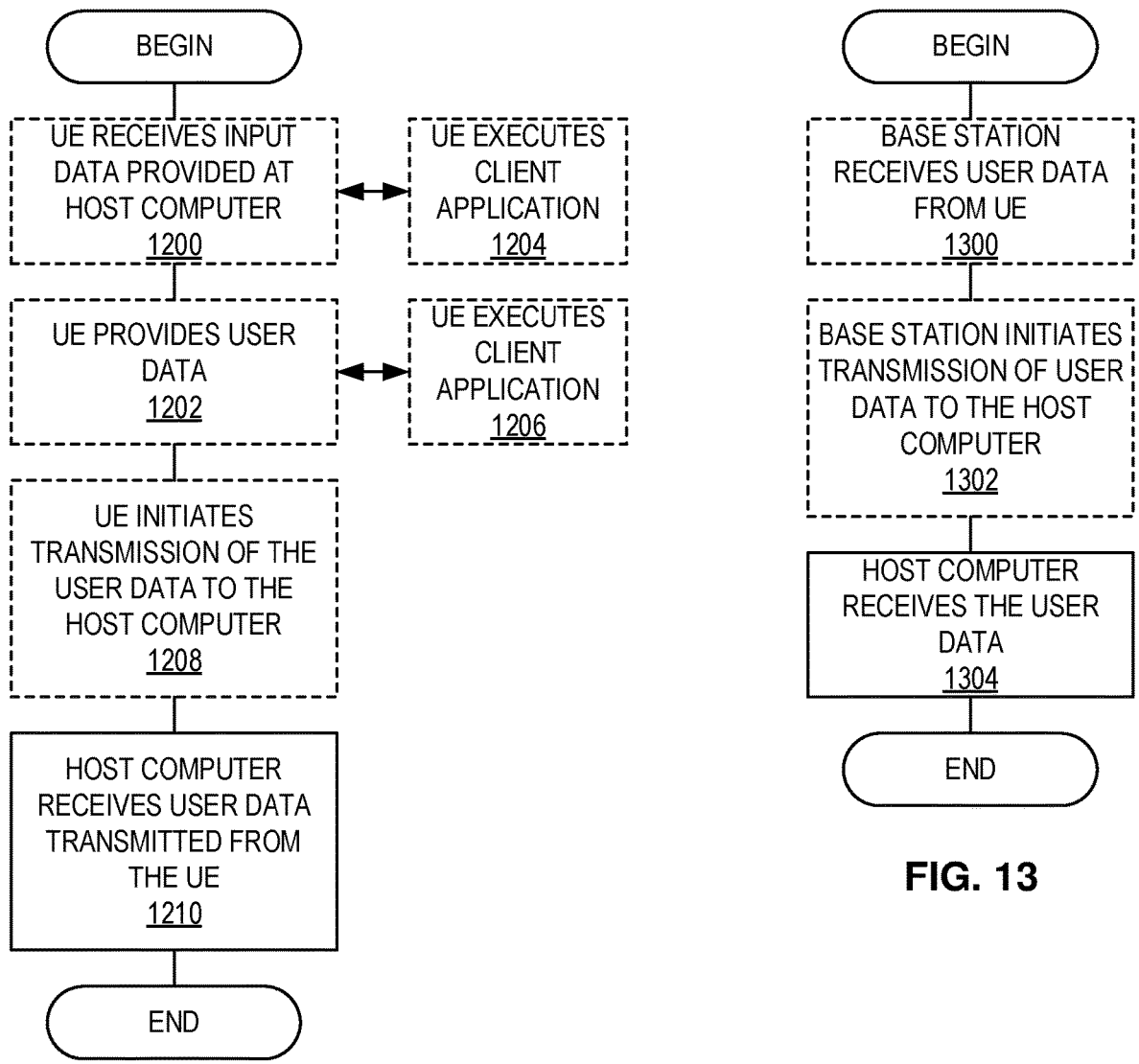

```
┌─────────────────────────────────────────────────────────────────────┐
│   Sending, to a first network node, a session setup message         │
│   comprising a QoS configuration for a flow and an indication       │
│   that the flow is subject to QoS notification control.             │
│                            1910                                     │
└─────────────────────────────────────────────────────────────────────┘
                                 │
                                 ▼
┌─────────────────────────────────────────────────────────────────────┐
│   Receiving, from the first network node, a first resource          │
│   notification message indicating that the QoS configuration        │
│   for the flow cannot be fulfilled.                                 │
│                            1920                                     │
└─────────────────────────────────────────────────────────────────────┘
                                 │
                                 ▼
┌─────────────────────────────────────────────────────────────────────┐
│   Determining, based on the first resource notification message,    │
│   whether to maintain, remove, or modify the flow.                  │
│                            1930                                     │
└─────────────────────────────────────────────────────────────────────┘
                                 │
                                 ▼
┌─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
│   Receiving, from the first network node, a second resource        │
│   notification message indicating that the QoS configuration       │
│   for the flow can be fulfilled.                                   │
│                            1940                                    │
└─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
                                 │
                                 ▼
┌─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
│   Sending, to the first network node, a further session setup      │
│   message comprising a modified QoS configuration for the flow.    │
│                            1950                                    │
└─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
```

FIG. 19

NOTIFICATION CONTROL OVER RAN INTERFACES

TECHNICAL FIELD

The present application relates generally to the telecommunications, and, more specifically, to apparatus, methods, and computer-readable media for managing quality of service (QoS) for data transmission to and/or from a wireless device or user equipment (UE) via a wireless network.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods and/or procedures disclosed herein do not have to be performed in the exact order disclosed, unless a step is explicitly described as following or preceding another step and/or where it is implicit that a step must follow or precede another step. Any feature of any of the embodiments disclosed herein can be applied to any other embodiment, wherever appropriate. Likewise, any advantage of any of the embodiments can apply to any other embodiments, and vice versa. Other objectives, features and advantages of the enclosed embodiments will be apparent from the following description.

Multi-connectivity can be envisioned as an important feature for fifth-generation (5G) RAN architectures standardized by 3GPP. FIG. 1 illustrates a high-level view of the 5G network architecture, comprising a Next Generation RAN (NG-RAN) and a 5G Core (5GC). The NG-RAN can comprise a set of gNodeB's (gNBs) connected to the 5GC via one or more NG interfaces, whereas the gNBs can be connected to each other via one or more Xn interfaces. Each of the gNBs can support frequency division duplexing (FDD), time division duplexing (TDD), or a combination thereof.

The NG RAN logical nodes shown in FIG. 1 (and described in, e.g., 3GPP TR 38.801 v1.2.0) include a Central Unit (CU or gNB-CU) and one or more Distributed Units (DU or gNB-DU). The CU is a logical node that is a centralized unit that hosts high layer protocols and includes a number of gNB functions, including controlling the operation of DUs. A DU is a decentralized logical node that hosts lower layer protocols and can include, depending on the functional split option, various subsets of the gNB functions. (As used herein, the terms "central unit" and "centralized unit" are used interchangeably, and the terms "distributed unit" and "decentralized unit" are used interchangeability.) The gNB-CU connects to gNB-DUs over respective F1 logical interfaces. The gNB-CU and connected gNB-DUs are only visible to other gNBs and the 5GC as a gNB, e.g., the F1 interface is not visible beyond gNB-CU.

In addition, the F1 interface between the gNB-CU and gNB-DU is specified, or based on, the following general principles:

F1 is an open interface;

F1 supports the exchange of signalling information between respective endpoints, as well as data transmission to the respective endpoints;

from a logical standpoint, F1 is a point-to-point interface between the endpoints (even in the absence of a physical direct connection between the endpoints);

F1 supports control plane (CP) and user plane (UP) separation, such that a gNB-CU may be separated in CP and UP;

F1 separates Radio Network Layer (RNL) and Transport Network Layer (TNL);

F1 enables exchange of user-equipment (UE) associated information and non-UE associated information;

F1 is defined to be future proof with respect to new requirements, services, and functions;

A gNB terminates X2, Xn, NG and S1-U interfaces;

Furthermore, a CU can host protocols such as RRC and PDCP, while a DU can host protocols such as RLC, MAC and PHY. Other variants of protocol distributions between CU and DU exist, such as hosting the RRC, PDCP and part of the RLC protocol in the CU (e.g., Automatic Retransmission Request (ARQ) function), while hosting the remaining parts of the RLC protocol in the DU, together with MAC and PHY. In some exemplary embodiments, the CU is assumed to host RRC and PDCP, where PDCP is assumed to handle both UP traffic and CP traffic. Nevertheless, other exemplary embodiments may utilize other protocol splits that by hosting certain protocols in the CU and certain others in the DU. Exemplary embodiments can also locate centralized control plane protocols (e.g., PDCP-C and RRC) in a different CU with respect to the centralized user plane protocols (e.g., PDCP-U).

In the architecture identified by CUs and DUs, Dual Connectivity (DC) can be achieved by allowing a UE to connect to multiple DUs served by the same CU, or by allowing a UE to connect to multiple DUs served by different CUs. As illustrated in FIG. 1, a gNB can include a gNB-CU connected to one or more gNB-DUs via respective F1 interfaces, all of which are described hereinafter in greater detail. In the NG-RAN architecture, however, a gNB-DU can be connected to only a single gNB-CU.

The NG-RAN is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In NG-Flex configuration, each gNB is connected to all 5GC nodes within a pool area. The pool area is defined in 3GPP TS 23.501. If security protection for control plane and user plane data on TNL of NG-RAN interfaces has to be supported, NDS/IP (as specified in 3GPP TS 33.401) shall be applied.

As mentioned above, multi-connectivity (e.g., dual-connectivity or "DC") is envisioned as an important feature to be supported in RAN 5G architectures. In this context, DC support includes establishing master (MN) and secondary nodes (SNs) and distributing UP traffic to the MN and SNs according to optimal, preferred, and/or desirable traffic and radio resource management techniques. CP traffic is assumed to terminate in one node only, i.e. the MN. FIGS. 2 and 3 below show the protocol and interfaces involved in DC, as described in 3GPP TS 38.300v0.6.0. FIG. 2 illustrates that a Master gNB (MgNB) can forward PDCP bearer traffic to a Secondary gNB (SgNB), while FIG. 3 illustrates the scenario where the SgNB can forward PDCP bearer traffic to the MgNB. In some exemplary embodiments, the MgNB and/or SgNB can be subject to the RAN split architecture (e.g., CU and DU) discussed above.

Furthermore, multi-RAT dual connectivity (MR-DC) can also be envisioned as an important feature in 5G RAN architectures. When MR-DC is applied, the MN can anchor the control plane towards the CN, while the SN can provide control and user plane resources to the UE via coordination with the MN. This is illustrated in FIG. 4, which is extracted from 3GPP TS 37.340. Within the scope of MR-DC, various user plane/bearer type solutions are possible, as seen in FIG. 5, also from TS 37.340.

Although the explanation above is in the context of 5G, NG-RAN nodes can provide both NR access via gNBs and E-UTRA (also known as "LTE") access via evolved Node B's (eNBs). Many features for connectivity, mobility, support of QoS, etc. apply for both NR/5G and E-UTRA/LTE access. As such, any feature described for gNBs can also apply to eNBs, which are often referred to in this context as "ng-eNB." For example, it is anticipated that higher/lower layer split described above for gNBs will also be used for ng-eNBs.

In the quality-of-service (QoS) framework being standardized for 5G networks, QoS flows are established between the NG-RAN and the 5GC (see, e.g., FIG. 1 above), where each QoS flow has a predefined set of QoS parameters (referred to as "5QI"). Each QoS flow can be associated with a predefined Guaranteed Flow Bit Rate (GFBR), i.e., the minimum bit-rate that should be guaranteed for the flow end-to-end. In the NG-RAN, multiple QoS flows can be mapped to a single data radio bearer (DRB) by the SDAP entity (see, e.g., FIGS. 2, 3, and 5). More details about the 5G QoS framework can be found in 3GPP TS 23.501.

Each GFBR QoS Flow can support Notification Control, whereby the 5GC can requests notifications from the NG-RAN when the GFBR can no longer be fulfilled during the lifetime of the QoS flow or, similarly, when a previously unfulfilled QoS can now be fulfilled. For example, if notification control is enabled for a particular QoS flow and the NG-RAN determines that the GFBR cannot be fulfilled, NG-RAN shall send a notification towards SMF. Subsequently, NG-RAN shall keep the QoS flow active and try to fulfil the GFBR, absent any contrary instruction from 5GC. Upon receiving such a notification from NG-RAN, 5GC can initiate N2 signalling to modify or remove the QoS flow. Subsequently, if the QoS flow is not removed, NG-RAN should send a new notification if the GFBR can be fulfilled again. Alternately, after a configured time, the NG-RAN can send a subsequent notification that the GFBR cannot be fulfilled.

Nevertheless, the NG-RAN split architecture exemplified by FIG. 1 and the various dual-connectivity (DC) configurations exemplified by FIGS. 2-5 create difficulties for Notification Control between NG-RAN and 5GC. For example, the Xn and F1 interfaces internal to the gNBs provide no mechanism to support Notification Control.

SUMMARY

Accordingly, exemplary embodiments of the present disclosure address these shortcomings in 5G networks, thereby facilitating management of end-to-end QoS in various NG-RAN topologies and arrangements. Such exemplary embodiments can include methods and/or procedures performed by a first network node (e.g., gNB-CU or MgNB) for monitoring the quality-of-service (QoS) of a flow comprising a data session with a user equipment (UE). The exemplary method and/or procedure can include the first network node receiving, from a core network node, a session setup message comprising a QoS configuration for the flow and an indication that the flow is subject to QoS notification control. The exemplary method and/or procedure can also include the first network node determining, based on the QoS configuration, radio resources to be used for the flow. The exemplary method and/or procedure can include the first network node sending, to a second network node, a resource setup message comprising an identification of the radio resources and an indication that at least one of the flow and the radio resources is subject to QoS notification control. The exemplary method and/or procedure can also include the first network node receiving, from the second network node, a first notification control indication that the QoS configuration for at least one of the flow and the radio resources cannot be fulfilled. The exemplary method and/or procedure can also include the first network node sending, to the core network node, a first resource notification message indicating that the QoS configuration for the flow cannot be fulfilled.

In some embodiments, the exemplary method and/or procedure can further include the first network node receiving, from the second network node, a second notification control indication that the QoS configuration for at least one of the flow and the radio resources can be fulfilled; and sending, to the core network node, a second resource notification message indicating that the QoS configuration for the flow can be fulfilled. In some exemplary embodiments, the first notification control indication can further comprises a request to remap the flow to different radio resources, and the first network node can attempt to remap the flow to different radio resources prior to sending the first resource notification message.

In some embodiments, the exemplary method and/or procedure can further include, after receiving the first notification control indication, the first network node attempts to modify the QoS associated with the flow; and if the attempt to modify the QoS associated with the flow is successful, the first network node indicates the modified QoS in the first resource notification message. In some exemplary embodiments, the resource setup message can further comprises at least one of a time period and an amount pertaining to a determination that the QoS configuration for at least one of the flow and the radio resources cannot be fulfilled.

In some embodiments, the exemplary method and/or procedure can further include the first network node receiving, from the core network node, a further session setup message comprising a modified QoS configuration for the flow; and sending, to the second network node, a further resource setup message comprising an identification of the radio resources corresponding to the modified QoS configuration for the flow. In some exemplary embodiments, the first network node can be a central unit (CU) and the second network node can be a distributed unit (DU), and the radio resources can comprise a data radio bearer (DRB) associated with the DU. In some exemplary embodiments, the first network node can be a master node (MN) and the second network node can be a secondary node (SN), and the identification of the radio resources can comprise a request to offload a data radio bearer (DRB) associated with the flow to the SN.

Exemplary embodiments also include network nodes (e.g., gNB-CU or MgNB) configured and/or adapted to perform the operations of the above-described exemplary methods and/or procedures.

Other exemplary embodiments can include methods and/or procedures performed by a second network node (e.g., gNB-DU or SgNB) for monitoring the quality-of-service (QoS) of a flow comprising a flow comprising a data session with a user equipment (UE). The exemplary methods and/or procedures can include the second network node receiving, from a first network node, a resource setup message comprising: an identification of first radio resources; a QoS configuration associated with the flow; and an indication that at least one of the flow and the first radio resources is subject to QoS notification control. The exemplary methods and/or procedures can also include the second network node determining, based on monitoring the radio resources, that the QoS configuration cannot be fulfilled with respect to at least one of the flow and the first radio resources. The exemplary methods and/or procedures can also include the second network node sending, to the first network node, a first notification control indication that the QoS configuration for at least one of the flow and the first radio resources cannot be fulfilled.

In some embodiments, the exemplary method and/or procedure can also include the second network node sending, to the first network node, a second notification control indication that the QoS configuration for at least one of the flow and the first radio resources can be fulfilled. In some embodiments, the exemplary method and/or procedure can also include the second network node sending, to the first network node in association with the first notification control indication, a request to remap the flow to different radio resources; and receiving, from the first network node, a further resource setup message comprising an identification of second radio resources. In some exemplary embodiments, the request to remap the flow to different resources comprises an identification of particular resources.

In some embodiments, the exemplary method and/or procedure can also include the second network node receiving, from the first network node in response to the first notification control indication, a further QoS configuration associated with the flow. In some exemplary embodiments, the resource setup message further comprises at least one of a time period and an amount, and the determination that the QoS configuration for at least one of the flow and the first radio resources cannot be fulfilled, is based on the at least one of the time period and the amount. In some exemplary embodiments, the first network node can be a central unit (CU) and the second network node can be a distributed unit (DU), and the radio resources can comprise a data radio bearer (DRB) associated with the DU. In some exemplary embodiments, the first network node can be a master node (MN) and the second network node can be a secondary node (SN), and the identification of the radio resources can comprise a request to offload a data radio bearer (DRB) associated with the flow to the SN.

Exemplary embodiments can also include second network nodes (e.g., gNB-DUs or SgNBs) configured and/or adapted to perform the operations of the above-described exemplary methods and/or procedures.

These and other exemplary embodiments can provide various advantages, including improved flexibility for the network to monitor end-to-end quality-of-service (QoS) of data flows, including their corresponding radio bearers, associated with data sessions between a user equipment (UE) and another entity, such as an over-the-top (OTT) data application or service external to the 5G network. These and other advantages can facilitate more timely design, implementation, and deployment of 5G/NR solutions. Furthermore, such embodiments can facilitate flexible and timely control of data session QoS, which can lead to improvements in capacity, throughput, latency, etc. that are envisioned by 5G/NR and important for the growth of OTT services.

BRIEF DESCRIPTION OF THE DRAWINGS

The following Figures illustrate various exemplary aspects of embodiments disclosed herein:

FIG. 10-13 are flow diagrams illustrating various exemplary methods and/or procedures implemented in a communication system, according to various exemplary embodiments of the present disclosure.

FIG. 19 is a flow diagram illustrating exemplary methods and/or procedures performed by a core network node, according to various exemplary embodiments of the present disclosure.

DETAILED DESCRIPTION

Exemplary embodiments briefly summarized above will now be described more fully with reference to the accompanying drawings. These descriptions are provided by way of example to explain the subject matter to those skilled in the art, and should not be construed as limiting the scope of the subject matter to only the embodiments described herein. More specifically, examples are provided below that illustrate the operation of various embodiments according to the advantages discussed above.

In 4G systems (4GS), the eNB constantly monitors the QoS of each radio bearer. The QoS monitoring is typically performed by the lower layers (e.g., baseband), because it facilitates very precise measurements since the lower layers have detailed knowledge of the radio conditions. In the 5G System (5GS), it is also expected that the NG-RAN node will monitor QoS in the lower layers, either on a bearer level or on a QoS flow level. In either case, Notification Control can be necessary for such monitoring.

Figure 1:
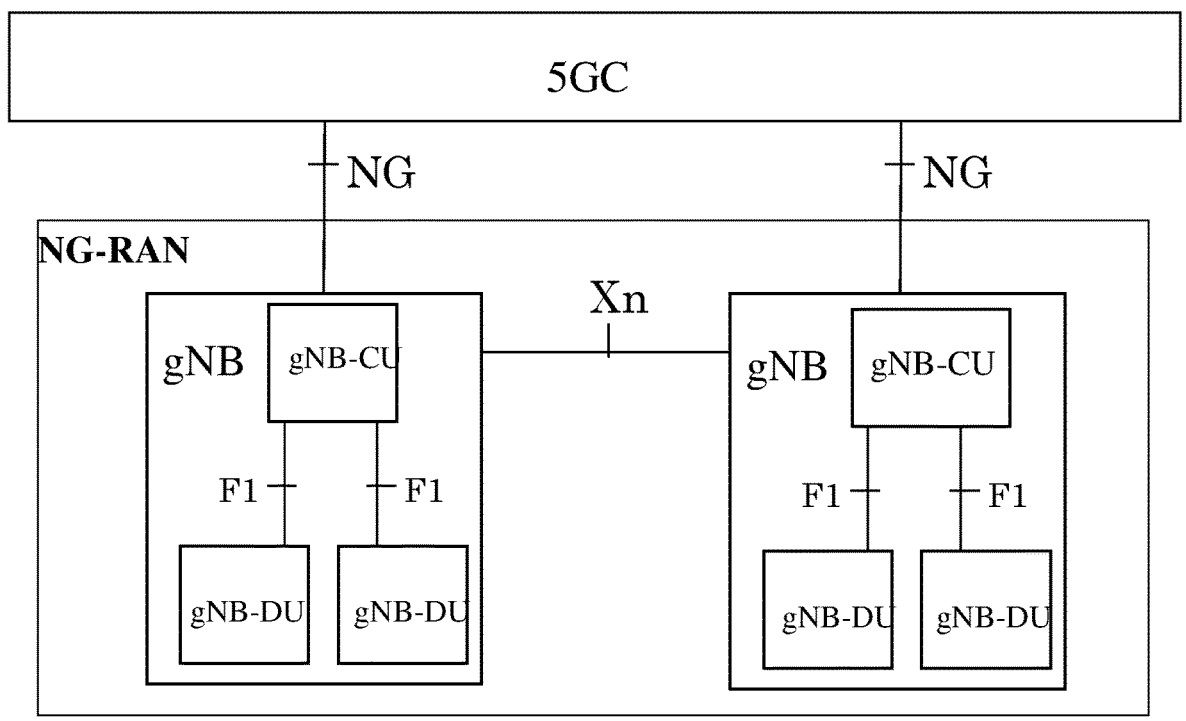
FIG. 1 shows a block diagram of an exemplary 5G logical network architecture.
Figure 2:
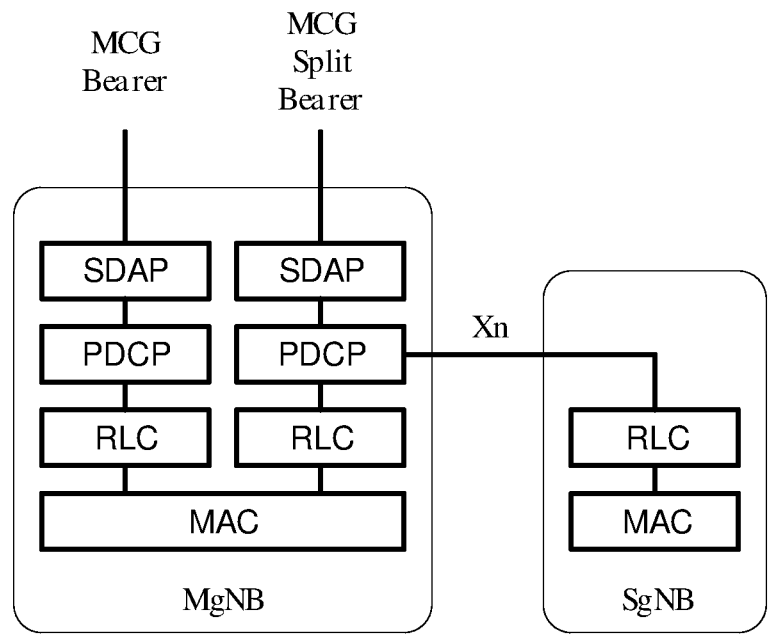
FIGS. 2-3 illustrate two exemplary protocol stacks for user plane (UP) traffic forwarding in dual-connectivity (DC) scenarios in a 5G RAN.
Figure 3:
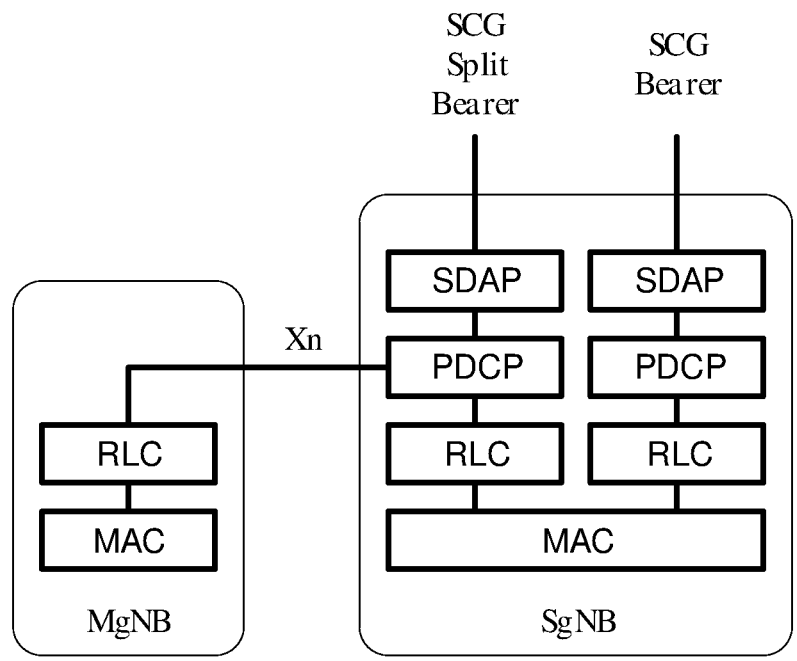
Figure 4:
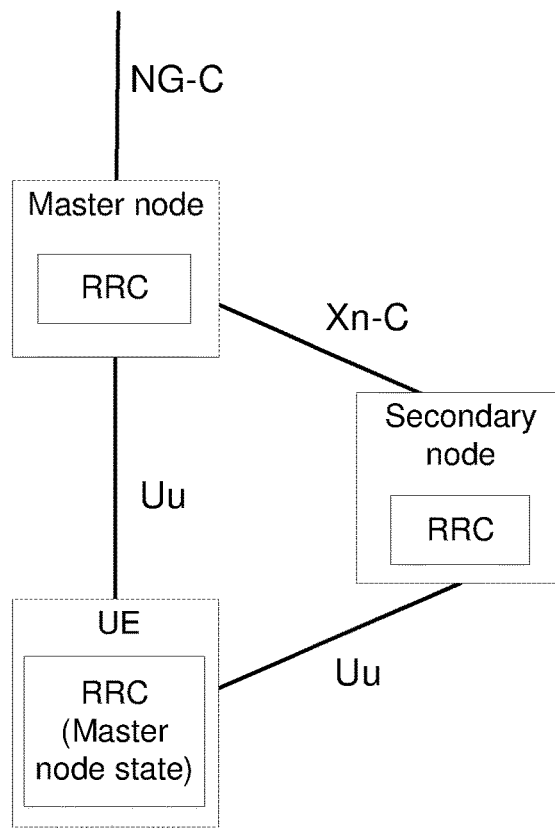
FIGS. 4-5 illustrates two exemplary multi-RAT dual connectivity (MR-DC) scenarios involving a 5G RAN.
Figure 5:
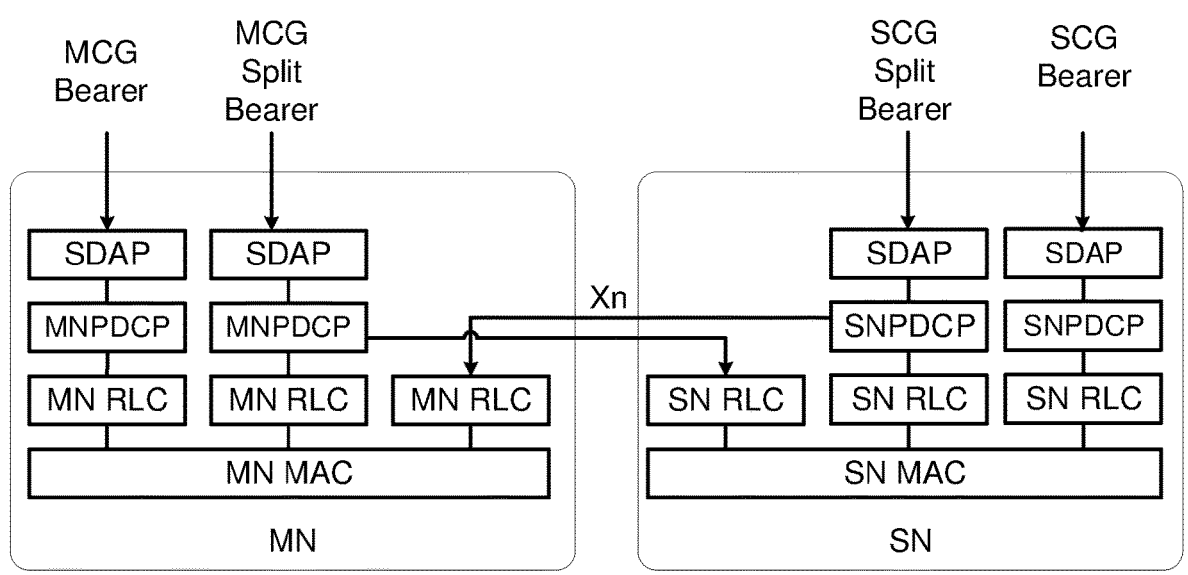

In case that the NG-RAN node is separated into a DU and a CU, such as shown in FIG. 1, the lower-layers reside in the DU and the higher-layers reside in the CU. Therefore, signalling is required over the F1 interface. In case that a QoS flow monitoring is subject to Notification Control, the higher layers should send any notification requirements to the lower layers. The information can be sent either per-flow or per-bearer. In this way, the lower layers are aware that if the QoS for the bearer or flow cannot be fulfilled anymore, they must provide an indication to the higher-layers. This information allows the higher-layers to trigger notification signalling toward 5GC as specified in 3GPP TS 23.501. Since the F1 interface connects the higher and lower layers in the split architecture, the DU-CU notification signalling can take place over the F1 interface using, e.g., the F1 Application Protocol (F1AP).

In some exemplary embodiments, the CU can send to the DU an indication on whether a QoS-flow and/or the corresponding bearer (DRB) is subject to Notification Control. This can be realized, e.g., by introducing an information element (IE) in the UE Context Setup Request and UE Context Modification Request messages in the F1AP. This IE can indicate a QoS flow mapped to a specific DRB or a specific DRB. In other embodiments, this can be realized by a new gNB-CU-initiated and UE-associated F1AP procedure, which specifies whether a QoS flow or DRB is subject to notification control. In some embodiments, the CU can include additional information pertaining to the QoS monitoring such as, e.g., a time period and/or a QoS amount.

In such exemplary embodiments, the DU can monitor the actual QoS for the QoS flow and/or DRB and report to the CU if it cannot fulfill the configured QoS for that QoS flow and/or DRB. This condition can occur, e.g., if radio conditions cause the monitored (actual) QoS to be less than the configured (desired) QoS for some period of time and/or by some amount, either of which can be fixed, predetermined, or configurable. For example, the reporting can be realized by introducing an IE to the F1AP UE Context Modification Required message. In other embodiments, the reporting can be realized by a new gNB-DU-initiated and UE-associated F1AP procedure.

Upon receiving a notification from CU that QoS is not being fulfilled for a QoS flow, the 5GC can decide whether to remove, maintain, or modify the QoS flow. In case that the flow or bearer is not removed by 5GC, the DU can continue monitoring its QoS and can report to the CU when it has determined that it can again fulfil the configured QoS again, e.g., for some period of time and/or by some amount, either of which can be fixed, predetermined, or configurable. For example, this reporting can be realized by introducing an IE to the F1AP UE Context Modification Required message. In other embodiments, the reporting can be realized by a new gNB-DU-initiated and UE-associated F1AP procedure.

In other embodiments, upon receiving a DU report that the configured QoS cannot be fulfilled for a particular QoS flow, the CU can determine whether to modify the configured QoS for the particular QoS flow. For example, the CU can determine that the QoS flow can be configured to a reduced QoS that can be fulfilled based on, e.g., information received from the reporting DU and/or other information accessible to the CU. For example, the CU can determine whether to modify the QoS configuration instead of, or in addition to, reporting the unfulfilled QoS to 5GC. Furthermore, if the CU configures the flow to use a reduced QoS (e.g., by sending one or more messages to the DU), the CU can then report the reconfigured QoS to 5GC.

In some embodiments, in addition to reporting the unfulfilled QoS flow, the DU can request the CU to remap the unfulfilled QoS flow to a different DRB. For example, the DU could indicate a particular DRB for such remapping or merely that a remapping is required. In response, the CU can remap the QoS flow to a particular DRB, e.g., the DRB requested by the DU or a DRB dedicated to otherwise unfulfilled QoS flows. Alternately, the CU can determine that the identified remapping is not required, desirable, and/or feasible due, e.g., to other prevailing conditions.

Figure 6:
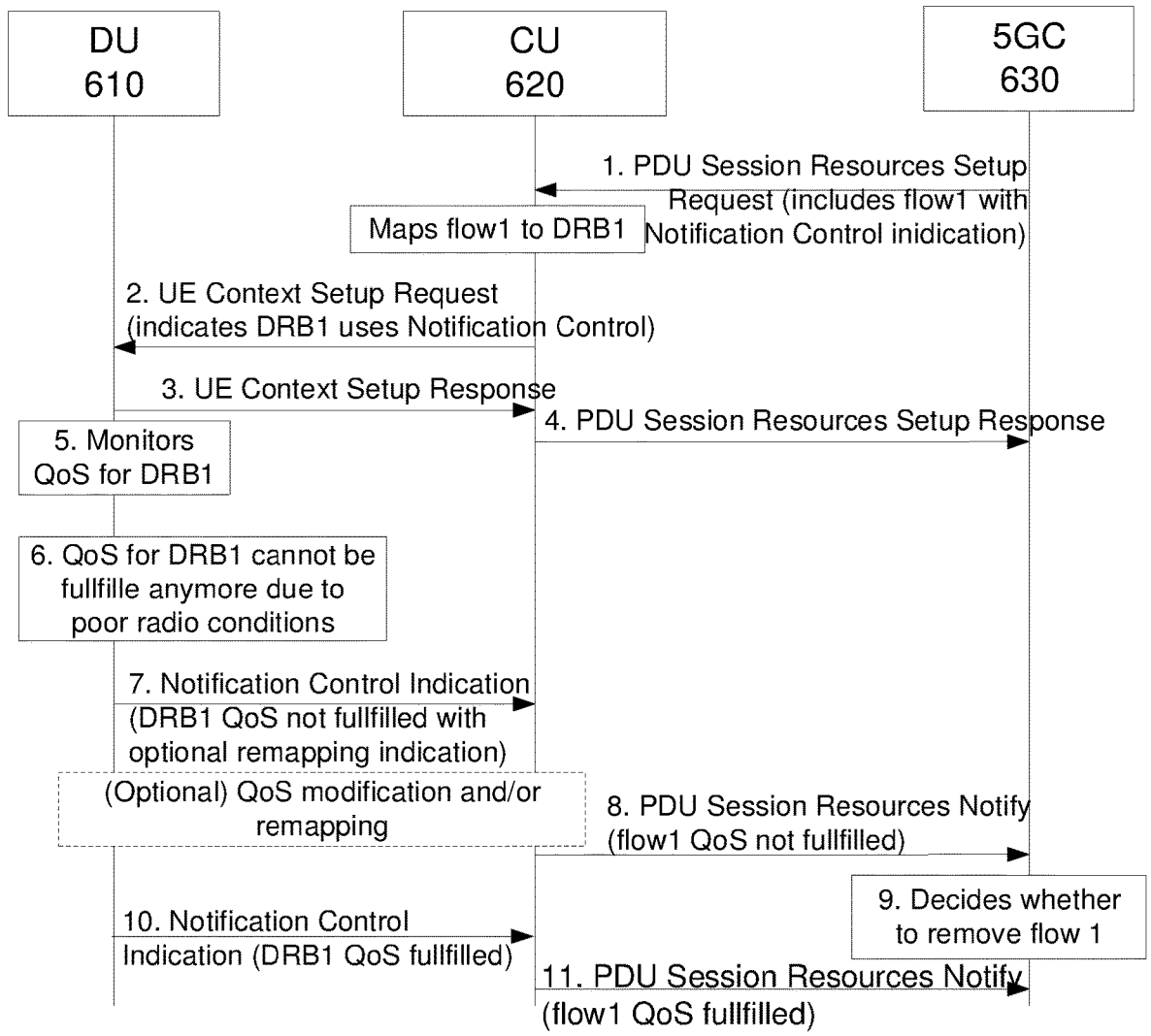
FIG. 6 illustrates an exemplary information flow among elements of a 5G network comprising a DU-CU split architecture for supporting QoS Notification Control, according to various exemplary embodiments of the present disclosure.

FIG. 6 illustrates an exemplary information flow among elements of a 5G network comprising a DU-CU split architecture for supporting QoS Notification Control, according to some exemplary embodiments of the present disclosure. In the figure and the following description, various operations are given numerical labels or designations. However, this is for convenience only and should not be interpreted as limiting the operations to occur in any particular numerical order.

In operation #1, the 5GC 630 can send a PDU Session Resource Setup Request message (e.g., as part of NG Application Procotol or "NGAP") to the NG-RAN CU node (e.g., CU 620). The PDU Session Resource Setup Request message can identify a QoS flow (e.g., "QoS flow 1") that is subject to Notification Control. After receiving this message, the CU 620 maps QoS flow 1 to a particular DRB, such as "DRB 1." In operation #2, the CU 620 can send a UE Context Setup Request message (e.g., as part of F1AP) to the DU 610. The UE Context Setup Request message can include an IE identifying that DRB 1 is subject to Notification Control. Alternatively, the IE can identify that QoS flow 1 is subject to Notification Control. In either case, the CU 620 can also identify a relationship between DRB 1 and QoS flow 1, either in UE Context Setup Request or in another message not shown.

In operation #3, the DU 610 can send a UE Context Setup Response message (e.g., as part of F1AP) informing the CU 620 that the UE context resources to enable DRB 1 have been setup successfully. In operation #4, the CU 620 can send 5GC 630 a PDU Session Resource Setup Response message (e.g., as part of NGAP) informing that the PDU Session (including QoS flow 1) has been setup successfully. Subsequently, the DU 610 monitors the actual QoS of DRB 1 and/or QoS flow 1, as the case may be. If the DU 610 determines that it can no longer fulfill the configured QoS for DRB 1 (e.g., the actual monitored QoS is less than the configured QoS due to poor conditions of the radio link(s) used by the DRB), in operation #7 the DU 610 uses an F1AP Notification Control Indication procedure to inform the CU 620 that the QoS for DRB 1 cannot be fulfilled. This message can, optionally, include a remapping request as discussed above. In operation #8, the CU 620 sends the PDU Session Resource Notify message (e.g., as part of NGAP) to inform 5GC 630 that the configured QoS for flow 1 can no longer be fulfilled. Prior to sending this notification, however, the CU 620 can optionally attempt to modify the QoS for flow 1 and/or remap flow 1 to a different DRB.

After receiving this notification, 5GC 630 can determine whether to remove, maintain, and/or modify QoS flow 1. In the case that 5GC 630 decides to maintain QoS flow 1, in operation #10 the DU 610 can invoke another F1AP Notification Control Indication procedure to inform the CU 620 that the QoS for DRB 1 can now be fulfilled. In operation #11, the CU 620 can send another PDU Session Resource Notify message (e.g., as part of NGAP) to inform 5GC 630 that the configured QoS for flow 1 can now be fulfilled.

In Dual Connectivity (DC) scenarios, the Master NG-RAN node (MN) should send an indication to the Secondary NG-RAN node (SN) on whether a flow or bearer that is offloaded to SN is subject to Notification Control. In this way, the SN is aware that if QoS for the bearer or flow cannot be fulfilled anymore, it must provide an indication to the MN. This information allows the MN to trigger notification signalling toward the 5GC as specified in TS 23.501. Since the Xn interface connects MN and SN in DC, the MN-SN notification signalling can take place over the Xn interface using, e.g., the Xn Application Protocol (XnAP).

In some exemplary embodiments, the MN can send to the SN an indication of whether a QoS-flow and/or the corresponding bearer (DRB) is subject to Notification Control. This can be realized, e.g., by introducing an information element (IE) in the SN Addition Request and SN Modification Request messages in XnAP. This IE can indicate a QoS flow mapped to a specific DRB or a specific DRB. In other embodiments, this can be realized by a new MN-initiated and UE-associated XnAP procedure, which specifies whether a QoS flow or DRB is subject to notification control. In some embodiments, the MN can include additional information pertaining to the QoS monitoring such as, e.g., a time period and/or a QoS amount.

In such exemplary embodiments, the SN can monitor the actual QoS for the QoS flow and/or DRB and report to the MN if it cannot fulfill the configured QoS for that QoS flow and/or DRB. This condition can occur, e.g., if radio conditions cause the monitored (actual) QoS to be less than the configured (desired) QoS for some period of time and/or by some amount, either of which can be fixed, predetermined, or configurable. For example, the reporting can be realized by introducing an IE to the XnAP SN Modification Required message. In other embodiments, the reporting can be realized by a new SN-initiated and UE-associated XnAP procedure.

Upon receiving a notification from MN that QoS is not being fulfilled for a QoS flow, 5GC can decide whether to remove, maintain, or modify the QoS flow. In case that the flow or bearer is not removed by 5GC, the SN can continue monitoring its QoS and can report to the MN when it has determined that it can again fulfil the configured QoS again, e.g., for some period of time and/or by some amount, either of which can be fixed, predetermined, or configurable. For example, this reporting can be realized by introducing an IE to the XnAP SN Modification Required message. In other embodiments, the reporting can be realized by a new SN-initiated and UE-associated F1AP procedure.

In other embodiments, upon receiving a SN report that the configured QoS cannot be fulfilled for a particular QoS flow, the MN can determine whether to modify the configured QoS for the particular QoS flow. For example, the MN can determine that the QoS flow can be configured to a reduced QoS that can be fulfilled based on, e.g., information received from the reporting SN and/or other information accessible to the MN. For example, the MN can determine whether to modify the QoS configuration instead of, or in addition to, reporting the unfulfilled QoS to 5GC. Furthermore, if the MN configures the flow to use a reduced QoS (e.g., by sending one or more messages to the SN), the MN can then report the reconfigured QoS to 5GC.

In some embodiments, in addition to reporting the unfulfilled QoS flow, the SN can request the MN to remap the unfulfilled QoS flow to a different DRB. For example, the SN could indicate a particular DRB for such remapping or merely that a remapping is required. In response, the MN can remap the QoS flow to a particular DRB, e.g., the DRB requested by the SN or a DRB dedicated to otherwise unfulfilled QoS flows. Alternately, the MN can determine that the identified remapping is not required, desirable, and/or feasible due, e.g., to other prevailing conditions and/or information accessible to the MN.

In certain DC scenarios, a DRB can be configured to utilize higher layers (e.g., PDCP/SDAP) of SN and lower layers (e.g., RLC/MAC/PHY) of MN. In such scenarios, there are two options for notifying the 5GC that QoS can no longer be fulfilled. First, the MN lower layers can inform the MN higher layers, which can report directly to 5GC as previously discussed. Alternately, the MN higher layers can inform the SN higher layers via the Xn interface. Based on this information, the SN can attempt to improve the radio conditions and/or configurations causing the configured QoS to be unfulfilled. For example, the SN can attempt to send more traffic via an already-configured SN radio leg, such that QoS can be maintained. If the SN cannot keep the QoS fulfilled, it can signal back to the MN, which can inform the 5GC via the NG interface.

Figure 7:
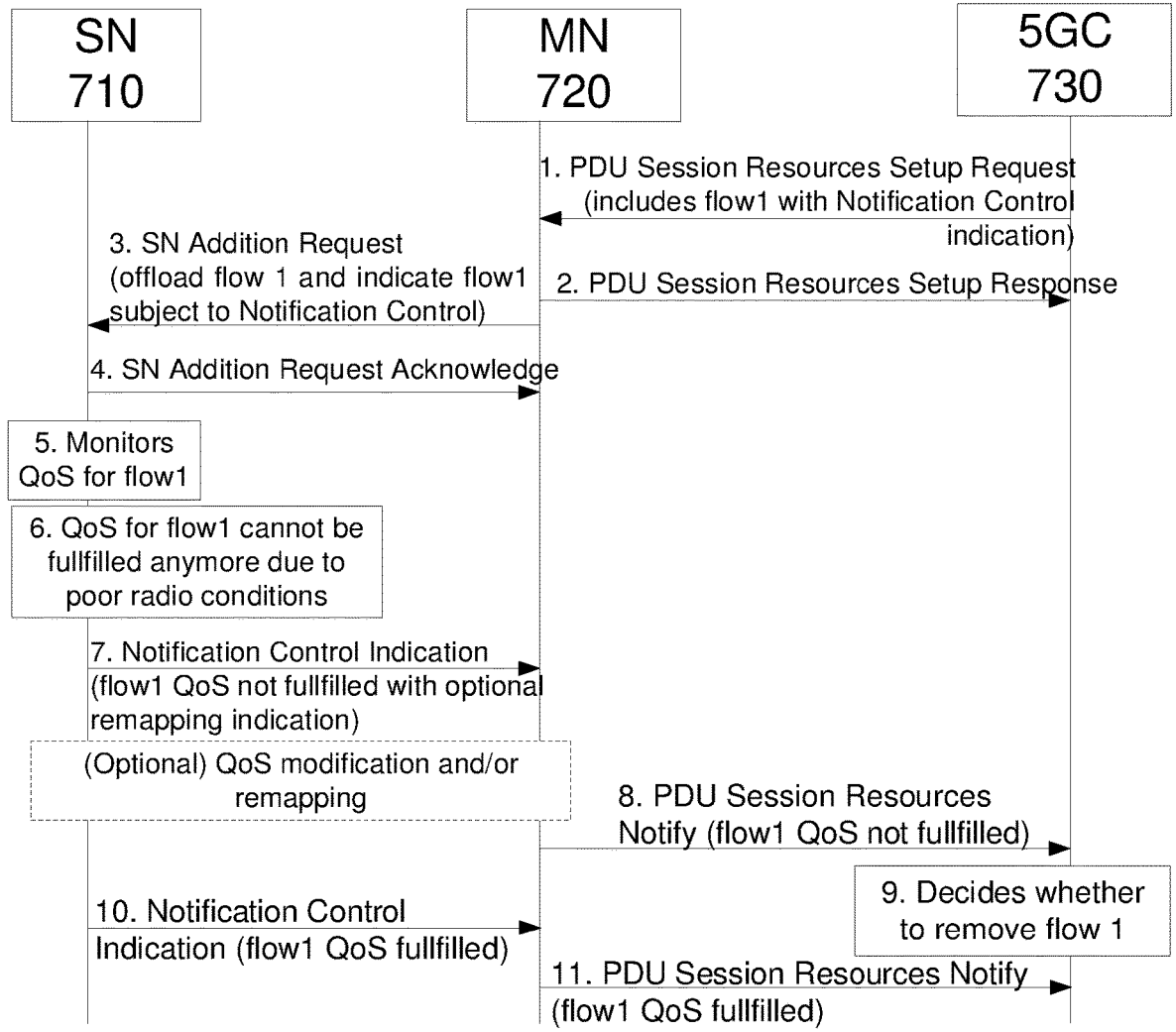
FIG. 7 illustrates an exemplary information flow for supporting QoS Notification Control among elements of a 5G network comprising a DC architecture, according to some exemplary embodiments of the present disclosure.

FIG. 7 illustrates an exemplary information flow for supporting QoS Notification Control among elements of a 5G network comprising a DC architecture, according to some exemplary embodiments of the present disclosure. In the figure and the following description, various operations are given numerical labels or designations. However, this is for convenience only and should not be interpreted as limiting the operations to occur in any particular numerical order.

In operation #1, 5GC 730 can send a PDU Session Resource Setup Request message (e.g., as part of NG Application Procotol or "NGAP") to the Master NG-RAN node (e.g., MN 720). The PDU Session Resource Setup Request message can identify a QoS flow (e.g., "QoS flow 1") that is subject to Notification Control. In operation #2, the MN 720 replies with a PDU Session Resource Setup Response message (e.g., as part of NGAP) to inform 5GC 730 that the PDU session (including flow 1) has been set up successfully. Subsequently, the MN 720 can decide to use DC and off-load flow 1 to a Secondary NG-RAN node (e.g., SN 710). In operation #3, MN 720 sends an SN Addition Request message (e.g., as part of XnAP) comprising an IE identifying flow 1 and indicating that it is subject to Notification Control. In operation #4, SN 710 responds with an SN Addition Request Acknowledge message (e.g., as part of XnAP) to inform MN 720 that SN 710 resources including flow 1 have been setup successfully. In embodiments where SN 710 uses a split CU-DU architecture, the information about Notification Control for flow 1 can also be provided over the F1 interface to the DU, as discussed above in relation to other embodiments.

Subsequently, SN 710 (e.g., the lower layers) monitors the actual QoS of DRB 1 and/or flow 1, as the case may be. If the SN 710 determines that it can no longer fulfill the configured QoS for flow 1 (e.g., the actual monitored QoS is less than the configured QoS due to poor conditions of the radio link(s) used by DRB 1), in operation #7 the SN 710 uses an XnAP Notification Control Indication procedure to inform the MN 720 that the QoS for flow 1 cannot be fulfilled. This message can, optionally, include a remapping request as discussed above. In embodiments where the SN 710 is further split into CU-DU, the XnAP Notification Control Indication procedure should be performed after an F1AP Notification Control Indication procedure, such as described above.

In operation #8, the MN 720 can send a PDU Session Resource Notify message (e.g., as part of NGAP) to inform 5GC 730 that the configured QoS for flow 1 can no longer be fulfilled. Prior to sending this notification, however, the MN 720 can optionally attempt to modify the QoS for flow 1 and/or remap flow 1 to a different DRB. After receiving this notification, 5GC 730 can determine whether to remove, maintain, and/or modify QoS flow 1. In the case that 5GC 730 decides to maintain QoS flow 1, in operation #10 the SN 710 can invoke another XnAP Notification Control Indication procedure to inform the MN 720 that the QoS for flow 1 can now be fulfilled. In operation #11, the MN 720 can send another PDU Session Resource Notify message (e.g., as part of NGAP) to inform 5GC 730 that the configured QoS for flow 1 can now be fulfilled.

Figure 14:
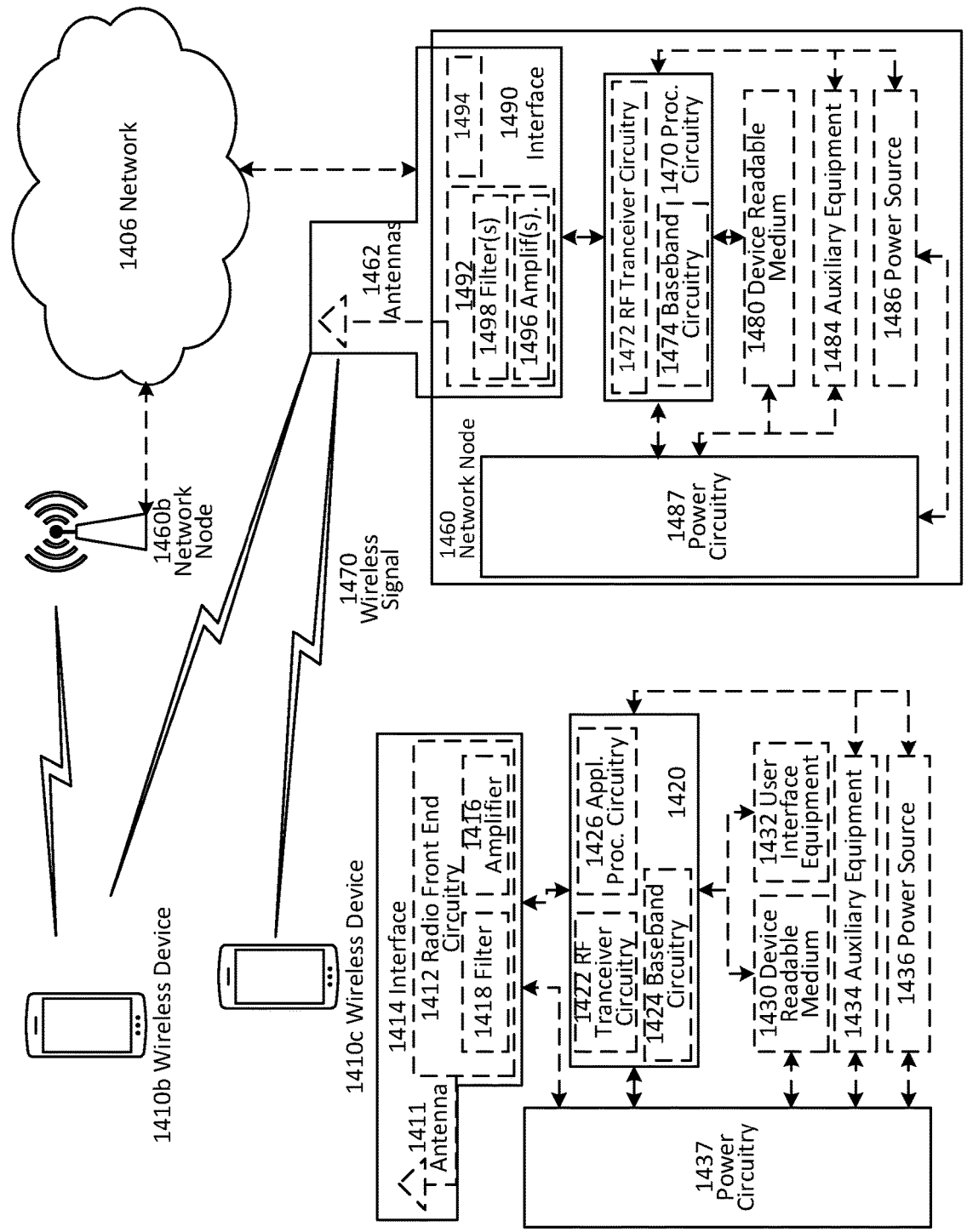
FIG. 14 is a block diagram of an exemplary wireless network configurable according to various exemplary embodiments of the present disclosure.

Although the subject matter described herein can be implemented in any appropriate type of system using any suitable components, the embodiments disclosed herein are described in relation to a wireless network, such as the example wireless network illustrated in FIG. 14. For simplicity, the wireless network of FIG. 14 only depicts network 1406, network nodes 1460 and 1460*b*, and WDs 1410, 1410*b*, and 1410*c*. In practice, a wireless network can further include any additional elements suitable to support communication between wireless devices or between a wireless device and another communication device, such as a landline telephone, a service provider, or any other network node or end device. Of the illustrated components, network node 1460 and wireless device (WD) 1410 are depicted with additional detail. The wireless network can provide communication and other types of services to one or more wireless devices to facilitate the wireless devices' access to and/or use of the services provided by, or via, the wireless network.

The wireless network can comprise and/or interface with any type of communication, telecommunication, data, cellular, and/or radio network or other similar type of system. In some embodiments, the wireless network can be configured to operate according to specific standards or other types of predefined rules or procedures. Thus, particular embodiments of the wireless network can implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1406 can comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1460 and WD 1410 comprise various components described in more detail below. These components work together in order to provide network node and/or wireless device functionality, such as providing wireless connections in a wireless network. In different embodiments, the wireless network can comprise any number of wired or wireless networks, network nodes, base stations, controllers, wireless devices, relay stations, and/or any other components or systems that can facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations can be categorized based on the amount of coverage they provide (or, stated differently, their transmit power level) and can then also be referred to as femto base stations, pico base stations, micro base stations, or macro base stations. A base station can be a relay node or a relay donor node controlling a relay. A network node can also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station can also be referred to as nodes in a distributed antenna system (DAS).

Further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node can be a virtual network node as described in more detail below. More generally, however, network nodes can represent any suitable device (or group of devices) capable, configured, arranged, and/or operable to enable and/or provide a wireless device with access to the wireless network or to provide some service to a wireless device that has accessed the wireless network.

In FIG. 14, network node 1460 includes processing circuitry 1470, device-readable (e.g., computer-readable) medium 1480, interface 1490, auxiliary equipment 1484, power source 1486, power circuitry 1487, and antenna 1462. Although network node 1460 illustrated in the example wireless network of FIG. 14 can represent a device that includes the illustrated combination of hardware components, other embodiments can comprise network nodes with different combinations of components. It is to be understood that a network node comprises any suitable combination of hardware and/or software needed to perform the tasks, features, functions and methods and/or procedures disclosed herein. Moreover, while the components of network node 1460 are depicted as single boxes located within a larger box, or nested within multiple boxes, in practice, a network node can comprise multiple different physical components that make up a single illustrated component (e.g., device readable medium 1480 can comprise multiple separate hard drives as well as multiple RAM modules).

Similarly, network node 1460 can be composed of multiple physically separate components (e.g., a NodeB component and a RNC component, or a BTS component and a BSC component, etc.), which can each have their own respective components. In certain scenarios in which network node 1460 comprises multiple separate components (e.g., BTS and BSC components), one or more of the separate components can be shared among several network nodes. For example, a single RNC can control multiple NodeB's. In such a scenario, each unique NodeB and RNC pair, can in some instances be considered a single separate network node. In some embodiments, network node 1460 can be configured to support multiple radio access technologies (RATs). In such embodiments, some components can be duplicated (e.g., separate device readable media 1480 for the different RATs) and some components can be reused (e.g., the same antenna 1462 can be shared by the RATs). Network node 1460 can also include multiple sets of the various illustrated components for different wireless technologies integrated into network node 1460, such as, for example, GSM, WCDMA, LTE, NR, WiFi, or Bluetooth wireless technologies. These wireless technologies can be integrated into the same or different chip or set of chips and other components within network node 1460.

Processing circuitry 1470 can be configured to perform any determining, calculating, or similar operations (e.g., certain obtaining operations) described herein as being provided by a network node. These operations performed by processing circuitry 1470 can include processing information obtained by processing circuitry 1470 by, for example, converting the obtained information into other information, comparing the obtained information or converted information to information stored in the network node, and/or performing one or more operations based on the obtained information or converted information, and as a result of said processing making a determination.

Processing circuitry 1470 can comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1460 components, such as device readable medium 1480, network node 1460 functionality. For example, processing circuitry 1470 can execute instructions stored in device readable medium 1480 or in memory within processing circuitry 1470. Such functionality can include providing any of the various wireless features, functions, or benefits discussed herein. In some embodiments, processing circuitry 1470 can include a system on a chip (SOC).

In some embodiments, processing circuitry 1470 can include one or more of radio frequency (RF) transceiver circuitry 1472 and baseband processing circuitry 1474. In some embodiments, radio frequency (RF) transceiver circuitry 1472 and baseband processing circuitry 1474 can be on separate chips (or sets of chips), boards, or units, such as radio units and digital units. In alternative embodiments, part or all of RF transceiver circuitry 1472 and baseband processing circuitry 1474 can be on the same chip or set of chips, boards, or units In certain embodiments, some or all of the functionality described herein as being provided by a network node, base station, eNB or other such network device can be performed by processing circuitry 1470 executing instructions stored on device readable medium 1480 or memory within processing circuitry 1470. In alternative embodiments, some or all of the functionality can be provided by processing circuitry 1470 without executing instructions stored on a separate or discrete device readable medium, such as in a hard-wired manner. In any of those embodiments, whether executing instructions stored on a device readable storage medium or not, processing circuitry 1470 can be configured to perform the described functionality. The benefits provided by such functionality are not limited to processing circuitry 1470 alone or to other components of network node 1460, but are enjoyed by network node 1460 as a whole, and/or by end users and the wireless network generally.

Device-readable medium 1480 can comprise any form of volatile or non-volatile computer-readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that can be used by processing circuitry 1470. Device readable medium 1480 can store any suitable instructions, data or information, including a computer program, software, an application including one or more of logic, rules, code, tables, etc. and/or other instructions capable of being executed by processing circuitry 1470 and, utilized by network node 1460. Device readable medium 1480 can be used to store any calculations made by processing circuitry 1470 and/or any data received via interface 1490. In some embodiments, processing circuitry 1470 and device readable medium 1480 can be considered to be integrated.

Interface 1490 is used in the wired or wireless communication of signalling and/or data between network node 1460, network 1406, and/or WDs 1410. As illustrated, interface 1490 comprises port(s)/terminal(s) 1494 to send and receive data, for example to and from network 1406 over a wired connection. Interface 1490 also includes radio front end circuitry 1492 that can be coupled to, or in certain embodiments a part of, antenna 1462. Radio front end circuitry 1492 comprises filters 1498 and amplifiers 1496. Radio front end circuitry 1492 can be connected to antenna 1462 and processing circuitry 1470. Radio front end circuitry can be configured to condition signals communicated between antenna 1462 and processing circuitry 1470. Radio front end circuitry 1492 can receive digital data that is to be sent out to other network nodes or WDs via a wireless connection. Radio front end circuitry 1492 can convert the digital data into a radio signal having the appropriate channel and bandwidth parameters using a combination of filters 1498 and/or amplifiers 1496. The radio signal can then be transmitted via antenna 1462. Similarly, when receiving data, antenna 1462 can collect radio signals which are then converted into digital data by radio front end circuitry 1492. The digital data can be passed to processing circuitry 1470. In other embodiments, the interface can comprise different components and/or different combinations of components.

In certain alternative embodiments, network node 1460 may not include separate radio front end circuitry 1492, instead, processing circuitry 1470 can comprise radio front end circuitry and can be connected to antenna 1462 without separate radio front end circuitry 1492. Similarly, in some embodiments, all or some of RF transceiver circuitry 1472 can be considered a part of interface 1490. In still other embodiments, interface 1490 can include one or more ports or terminals 1494, radio front end circuitry 1492, and RF transceiver circuitry 1472, as part of a radio unit (not shown), and interface 1490 can communicate with baseband processing circuitry 1474, which is part of a digital unit (not shown).

Antenna 1462 can include one or more antennas, or antenna arrays, configured to send and/or receive wireless signals. Antenna 1462 can be coupled to radio front end circuitry 1490 and can be any type of antenna capable of transmitting and receiving data and/or signals wirelessly. In some embodiments, antenna 1462 can comprise one or more omni-directional, sector or panel antennas operable to transmit/receive radio signals between, for example, 2 GHz and 66 GHz. An omni-directional antenna can be used to transmit/receive radio signals in any direction, a sector antenna can be used to transmit/receive radio signals from devices within a particular area, and a panel antenna can be a line of sight antenna used to transmit/receive radio signals in a relatively straight line. In some instances, the use of more than one antenna can be referred to as MIMO. In certain embodiments, antenna 1462 can be separate from network node 1460 and can be connectable to network node 1460 through an interface or port.

Antenna 1462, interface 1490, and/or processing circuitry 1470 can be configured to perform any receiving operations and/or certain obtaining operations described herein as being performed by a network node. Any information, data and/or signals can be received from a wireless device, another network node and/or any other network equipment. Similarly, antenna 1462, interface 1490, and/or processing circuitry 1470 can be configured to perform any transmitting operations described herein as being performed by a network node. Any information, data and/or signals can be transmitted to a wireless device, another network node and/or any other network equipment.

Power circuitry 1487 can comprise, or be coupled to, power management circuitry and can be configured to supply the components of network node 1460 with power for performing the functionality described herein. Power circuitry 1487 can receive power from power source 1486. Power source 1486 and/or power circuitry 1487 can be configured to provide power to the various components of network node 1460 in a form suitable for the respective components (e.g., at a voltage and current level needed for each respective component). Power source 1486 can either be included in, or external to, power circuitry 1487 and/or network node 1460. For example, network node 1460 can be connectable to an external power source (e.g., an electricity outlet) via an input circuitry or interface such as an electrical cable, whereby the external power source supplies power to power circuitry 1487. As a further example, power source 1486 can comprise a source of power in the form of a battery or battery pack which is connected to, or integrated in, power circuitry 1487. The battery can provide backup power should the external power source fail. Other types of power sources, such as photovoltaic devices, can also be used.

Alternative embodiments of network node 1460 can include additional components beyond those shown in FIG. 14 that can be responsible for providing certain aspects of the network node's functionality, including any of the functionality described herein and/or any functionality necessary to support the subject matter described herein. For example, network node 1460 can include user interface equipment to allow and/or facilitate input of information into network node 1460 and to allow and/or facilitate output of information from network node 1460. This can allow and/or facilitate a user to perform diagnostic, maintenance, repair, and other administrative functions for network node 1460.

As used herein, wireless device (WD) refers to a device capable, configured, arranged and/or operable to communicate wirelessly with network nodes and/or other wireless devices. Unless otherwise noted, the term WD can be used interchangeably herein with user equipment (UE). Communicating wirelessly can involve transmitting and/or receiving wireless signals using electromagnetic waves, radio waves, infrared waves, and/or other types of signals suitable for conveying information through air. In some embodiments, a WD can be configured to transmit and/or receive information without direct human interaction. For instance, a WD can be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc.

A WD can support device-to-device (D2D) communication, for example by implementing a 3GPP standard for sidelink communication, vehicle-to-vehicle (V2V), vehicle-to-infrastructure (V2I), vehicle-to-everything (V2X) and can in this case be referred to as a D2D communication device. As yet another specific example, in an Internet of Things (IoT) scenario, a WD can represent a machine or other device that performs monitoring and/or measurements, and transmits the results of such monitoring and/or measurements to another WD and/or a network node. The WD can in this case be a machine-to-machine (M2M) device, which can in a 3GPP context be referred to as an MTC device. As one particular example, the WD can be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD can represent a vehicle or other equipment that is capable of monitoring and/or reporting on its operational status or other functions associated with its operation. A WD as described above can represent the endpoint of a wireless connection, in which case the device can be referred to as a wireless terminal. Furthermore, a WD as described above can be mobile, in which case it can also be referred to as a mobile device or a mobile terminal.

As illustrated, wireless device 1410 includes antenna 1411, interface 1414, processing circuitry 1420, device readable medium 1430, user interface equipment 1432, auxiliary equipment 1434, power source 1436 and power circuitry 1437. WD 1410 can include multiple sets of one or more of the illustrated components for different wireless technologies supported by WD 1410, such as, for example, GSM, WCDMA, LTE, NR, WiFi, WiMAX, or Bluetooth wireless technologies, just to mention a few. These wireless technologies can be integrated into the same or different chips or set of chips as other components within WD 1410.

Antenna 1411 can include one or more antennas or antenna arrays, configured to send and/or receive wireless signals, and is connected to interface 1414. In certain alternative embodiments, antenna 1411 can be separate from WD 1410 and be connectable to WD 1410 through an interface or port. Antenna 1411, interface 1414, and/or processing circuitry 1420 can be configured to perform any receiving or transmitting operations described herein as being performed by a WD. Any information, data and/or signals can be received from a network node and/or another WD. In some embodiments, radio front end circuitry and/or antenna 1411 can be considered an interface.

As illustrated, interface 1414 comprises radio front end circuitry 1412 and antenna 1411. Radio front end circuitry 1412 comprise one or more filters 1418 and amplifiers 1416. Radio front end circuitry 1414 is connected to antenna 1411 and processing circuitry 1420, and can be configured to condition signals communicated between antenna 1411 and processing circuitry 1420. Radio front end circuitry 1412 can be coupled to or a part of antenna 1411. In some embodiments, WD 1410 may not include separate radio front end circuitry 1412; rather, processing circuitry 1420 can comprise radio front end circuitry and can be connected to antenna 1411. Similarly, in some embodiments, some or all of RF transceiver circuitry 1422 can be considered a part of interface 1414. Radio front end circuitry 1412 can receive digital data that is to be sent out to other network nodes or WDs via a wireless connection. Radio front end circuitry 1412 can convert the digital data into a radio signal having the appropriate channel and bandwidth parameters using a combination of filters 1418 and/or amplifiers 1416. The radio signal can then be transmitted via antenna 1411. Similarly, when receiving data, antenna 1411 can collect radio signals which are then converted into digital data by radio front end circuitry 1412. The digital data can be passed to processing circuitry 1420. In other embodiments, the interface can comprise different components and/or different combinations of components.

Processing circuitry 1420 can comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1410 components, such as device readable medium 1430, WD 1410 functionality. Such functionality can include providing any of the various wireless features or benefits discussed herein. For example, processing circuitry 1420 can execute instructions stored in device readable medium 1430 or in memory within processing circuitry 1420 to provide the functionality disclosed herein.

As illustrated, processing circuitry 1420 includes one or more of RF transceiver circuitry 1422, baseband processing circuitry 1424, and application processing circuitry 1426. In other embodiments, the processing circuitry can comprise different components and/or different combinations of components. In certain embodiments processing circuitry 1420 of WD 1410 can comprise a SOC. In some embodiments, RF transceiver circuitry 1422, baseband processing circuitry 1424, and application processing circuitry 1426 can be on separate chips or sets of chips. In alternative embodiments, part or all of baseband processing circuitry 1424 and application processing circuitry 1426 can be combined into one chip or set of chips, and RF transceiver circuitry 1422 can be on a separate chip or set of chips. In still alternative embodiments, part or all of RF transceiver circuitry 1422 and baseband processing circuitry 1424 can be on the same chip or set of chips, and application processing circuitry 1426 can be on a separate chip or set of chips. In yet other alternative embodiments, part or all of RF transceiver circuitry 1422, baseband processing circuitry 1424, and application processing circuitry 1426 can be combined in the same chip or set of chips. In some embodiments, RF transceiver circuitry 1422 can be a part of interface 1414. RF transceiver circuitry 1422 can condition RF signals for processing circuitry 1420.

In certain embodiments, some or all of the functionality described herein as being performed by a WD can be provided by processing circuitry 1420 executing instructions stored on device readable medium 1430, which in certain embodiments can be a computer-readable storage medium. In alternative embodiments, some or all of the functionality can be provided by processing circuitry 1420 without executing instructions stored on a separate or discrete device readable storage medium, such as in a hard-wired manner. In any of those particular embodiments, whether executing instructions stored on a device readable storage medium or not, processing circuitry 1420 can be configured to perform the described functionality. The benefits provided by such functionality are not limited to processing circuitry 1420 alone or to other components of WD 1410, but are enjoyed by WD 1410 as a whole, and/or by end users and the wireless network generally.

Processing circuitry 1420 can be configured to perform any determining, calculating, or similar operations (e.g., certain obtaining operations) described herein as being performed by a WD. These operations, as performed by processing circuitry 1420, can include processing information obtained by processing circuitry 1420 by, for example, converting the obtained information into other information, comparing the obtained information or converted information to information stored by WD 1410, and/or performing one or more operations based on the obtained information or converted information, and as a result of said processing making a determination.

Device readable medium 1430 can be operable to store a computer program, software, an application including one or more of logic, rules, code, tables, etc. and/or other instructions capable of being executed by processing circuitry 1420. Device readable medium 1430 can include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that can be used by processing circuitry 1420. In some embodiments, processing circuitry 1420 and device readable medium 1430 can be considered to be integrated.

User interface equipment 1432 can include components that allow and/or facilitate a human user to interact with WD 1410. Such interaction can be of many forms, such as visual, audial, tactile, etc. User interface equipment 1432 can be operable to produce output to the user and to allow and/or facilitate the user to provide input to WD 1410. The type of interaction can vary depending on the type of user interface equipment 1432 installed in WD 1410. For example, if WD 1410 is a smart phone, the interaction can be via a touch screen; if WD 1410 is a smart meter, the interaction can be through a screen that provides usage (e.g., the number of gallons used) or a speaker that provides an audible alert (e.g., if smoke is detected). User interface equipment 1432 can include input interfaces, devices and circuits, and output interfaces, devices and circuits. User interface equipment 1432 can be configured to allow and/or facilitate input of information into WD 1410, and is connected to processing circuitry 1420 to allow and/or facilitate processing circuitry 1420 to process the input information. User interface equipment 1432 can include, for example, a microphone, a proximity or other sensor, keys/buttons, a touch display, one or more cameras, a USB port, or other input circuitry. User interface equipment 1432 is also configured to allow and/or facilitate output of information from WD 1410, and to allow and/or facilitate processing circuitry 1420 to output information from WD 1410. User interface equipment 1432 can include, for example, a speaker, a display, vibrating circuitry, a USB port, a headphone interface, or other output circuitry. Using one or more input and output interfaces, devices, and circuits, of user interface equipment 1432, WD 1410 can communicate with end users and/or the wireless network, and allow and/or facilitate them to benefit from the functionality described herein.

Auxiliary equipment 1434 is operable to provide more specific functionality which may not be generally performed by WDs. This can comprise specialized sensors for doing measurements for various purposes, interfaces for additional types of communication such as wired communications etc. The inclusion and type of components of auxiliary equipment 1434 can vary depending on the embodiment and/or scenario.

Power source 1436 can, in some embodiments, be in the form of a battery or battery pack. Other types of power sources, such as an external power source (e.g., an electricity outlet), photovoltaic devices or power cells, can also be used. WD 1410 can further comprise power circuitry 1437 for delivering power from power source 1436 to the various parts of WD 1410 which need power from power source 1436 to carry out any functionality described or indicated herein. Power circuitry 1437 can in certain embodiments comprise power management circuitry. Power circuitry 1437 can additionally or alternatively be operable to receive power from an external power source; in which case WD 1410 can be connectable to the external power source (such as an electricity outlet) via input circuitry or an interface such as an electrical power cable. Power circuitry 1437 can also in certain embodiments be operable to deliver power from an external power source to power source 1436. This can be, for example, for the charging of power source 1436. Power circuitry 1437 can perform any converting or other modification to the power from power source 1436 to make it suitable for supply to the respective components of WD 1410.

Figure 15:
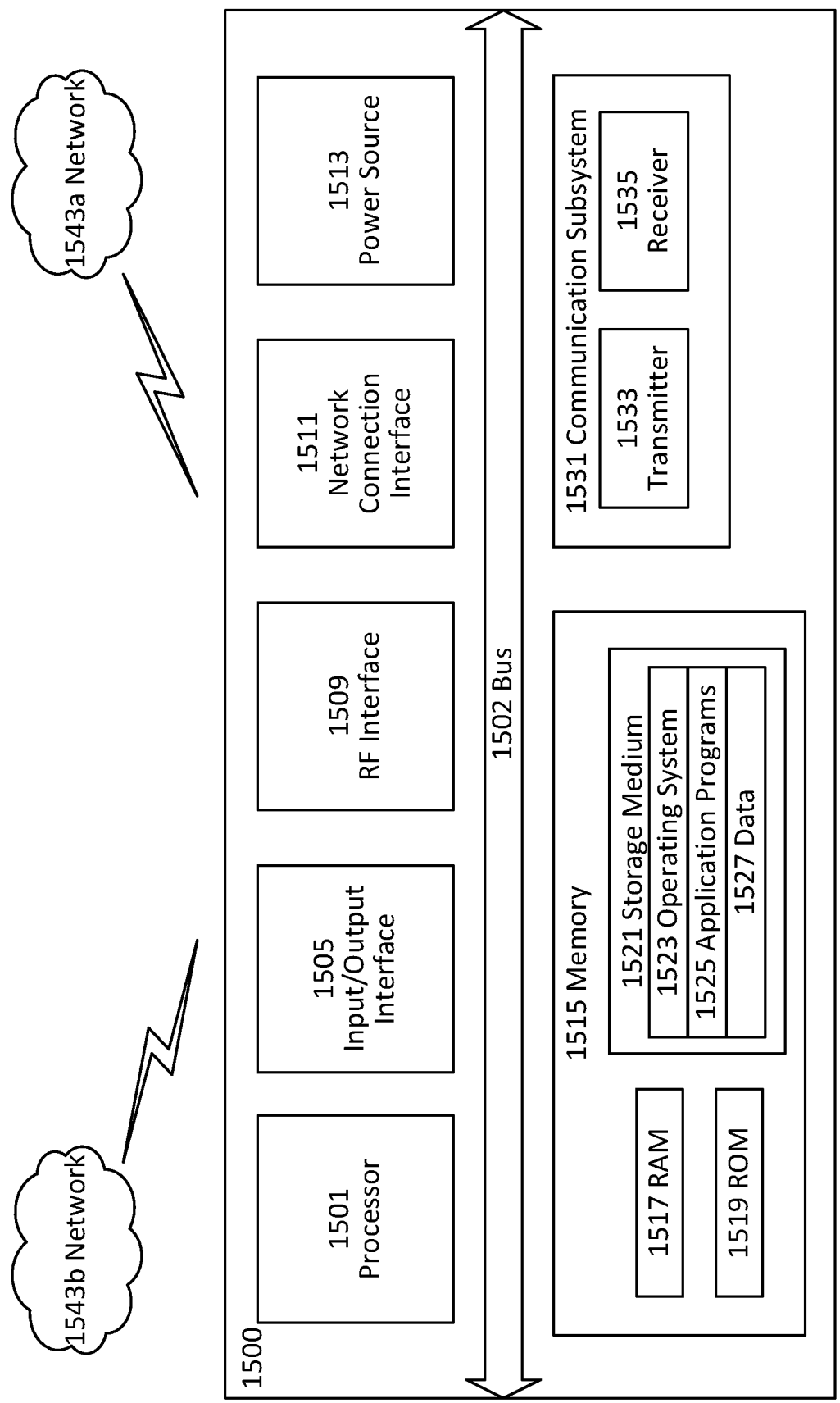
FIG. 15 is a block diagram of an exemplary user equipment (UE) configurable according to various exemplary embodiments of the present disclosure.

FIG. 15 illustrates one embodiment of a UE in accordance with various aspects described herein. As used herein, a user equipment or UE may not necessarily have a user in the sense of a human user who owns and/or operates the relevant device. Instead, a UE can represent a device that is intended for sale to, or operation by, a human user but which may not, or which may not initially, be associated with a specific human user (e.g., a smart sprinkler controller). Alternatively, a UE can represent a device that is not intended for sale to, or operation by, an end user but which can be associated with or operated for the benefit of a user (e.g., a smart power meter). UE 1500 can be any UE identified by the $3^{rd}$ Generation Partnership Project (3GPP), including a NB-IoT UE, a machine type communication (MTC) UE, and/or an enhanced MTC (eMTC) UE. UE 1500, as illustrated in FIG. 15, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE can be used interchangeable. Accordingly, although FIG. 15 is a UE, the components discussed herein are equally applicable to a WD, and vice-versa.

In FIG. 15, UE 1500 includes processing circuitry 1501 that is operatively coupled to input/output interface 1505, radio frequency (RF) interface 1509, network connection interface 1511, memory 1515 including random access memory (RAM) 1517, read-only memory (ROM) 1519, and storage medium 1521 or the like, communication subsystem 1531, power source 1533, and/or any other component, or any combination thereof. Storage medium 1521 includes operating system 1523, application program 1525, and data 1527. In other embodiments, storage medium 1521 can include other similar types of information. Certain UEs can utilize all of the components shown in FIG. 15, or only a subset of the components. The level of integration between the components can vary from one UE to another UE. Further, certain UEs can contain multiple instances of a component, such as multiple processors, memories, transceivers, transmitters, receivers, etc.

In FIG. 15, processing circuitry 1501 can be configured to process computer instructions and data. Processing circuitry 1501 can be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1501 can include two central processing units (CPUs). Data can be information in a form suitable for use by a computer.

In the depicted embodiment, input/output interface 1505 can be configured to provide a communication interface to an input device, output device, or input and output device. UE 1500 can be configured to use an output device via input/output interface 1505. An output device can use the same type of interface port as an input device. For example, a USB port can be used to provide input to and output from UE 1500. The output device can be a speaker, a sound card, a video card, a display, a monitor, a printer, an actuator, an emitter, a smartcard, another output device, or any combination thereof. UE 1500 can be configured to use an input device via input/output interface 1505 to allow and/or facilitate a user to capture information into UE 1500. The input device can include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display can include a capacitive or resistive touch sensor to sense input from a user. A sensor can be, for instance, an accelerometer, a gyroscope, a tilt sensor, a force sensor, a magnetometer, an optical sensor, a proximity sensor, another like sensor, or any combination thereof. For example, the input device can be an accelerometer, a magnetometer, a digital camera, a microphone, and an optical sensor.

In FIG. 15, RF interface 1509 can be configured to provide a communication interface to RF components such as a transmitter, a receiver, and an antenna. Network connection interface 1511 can be configured to provide a communication interface to network 1543a. Network 1543a can encompass wired and/or wireless networks such as a local-area network (LAN), a wide-area network (WAN), a computer network, a wireless network, a telecommunications network, another like network or any combination thereof. For example, network 1543a can comprise a Wi-Fi network. Network connection interface 1511 can be configured to include a receiver and a transmitter interface used to communicate with one or more other devices over a communication network according to one or more communication protocols, such as Ethernet, TCP/IP, SONET, ATM, or the like. Network connection interface 1511 can implement receiver and transmitter functionality appropriate to the communication network links (e.g., optical, electrical, and the like). The transmitter and receiver functions can share circuit components, software or firmware, or alternatively can be implemented separately.

RAM 1517 can be configured to interface via bus 1502 to processing circuitry 1501 to provide storage or caching of data or computer instructions during the execution of software programs such as the operating system, application programs, and device drivers. ROM 1519 can be configured to provide computer instructions or data to processing circuitry 1501. For example, ROM 1519 can be configured to store invariant low-level system code or data for basic system functions such as basic input and output (I/O), startup, or reception of keystrokes from a keyboard that are stored in a non-volatile memory. Storage medium 1521 can be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1521 can be configured to include operating system 1523, application program 1525 such as a web browser application, a widget or gadget engine or another application, and data file 1527. Storage medium 1521 can store, for use by UE 1500, any of a variety of various operating systems or combinations of operating systems.

Storage medium 1521 can be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1521 can allow and/or facilitate UE 1500 to access computer-executable instructions, application programs or the like, stored on transitory or non-transitory memory media, to off-load data, or to upload data. An article of manufacture, such as one utilizing a communication system can be tangibly embodied in storage medium 1521, which can comprise a device readable medium.

In FIG. 15, processing circuitry 1501 can be configured to communicate with network 1543*b* using communication subsystem 1531. Network 1543*a* and network 1543*b* can be the same network or networks or different network or networks. Communication subsystem 1531 can be configured to include one or more transceivers used to communicate with network 1543*b*. For example, communication subsystem 1531 can be configured to include one or more transceivers used to communicate with one or more remote transceivers of another device capable of wireless communication such as another WD, UE, or base station of a radio access network (RAN) according to one or more communication protocols, such as IEEE 802.15, CDMA, WCDMA, GSM, LTE, UTRAN, WiMax, or the like. Each transceiver can include transmitter 1533 and/or receiver 1535 to implement transmitter or receiver functionality, respectively, appropriate to the RAN links (e.g., frequency allocations and the like). Further, transmitter 1533 and receiver 1535 of each transceiver can share circuit components, software or firmware, or alternatively can be implemented separately.

In the illustrated embodiment, the communication functions of communication subsystem 1531 can include data communication, voice communication, multimedia communication, short-range communications such as Bluetooth, near-field communication, location-based communication such as the use of the global positioning system (GPS) to determine a location, another like communication function, or any combination thereof. For example, communication subsystem 1531 can include cellular communication, Wi-Fi communication, Bluetooth communication, and GPS communication. Network 1543*b* can encompass wired and/or wireless networks such as a local-area network (LAN), a wide-area network (WAN), a computer network, a wireless network, a telecommunications network, another like network or any combination thereof. For example, network 1543*b* can be a cellular network, a Wi-Fi network, and/or a near-field network. Power source 1513 can be configured to provide alternating current (AC) or direct current (DC) power to components of UE 1500.

The features, benefits and/or functions described herein can be implemented in one of the components of UE 1500 or partitioned across multiple components of UE 1500. Further, the features, benefits, and/or functions described herein can be implemented in any combination of hardware, software or firmware. In one example, communication subsystem 1531 can be configured to include any of the components described herein. Further, processing circuitry 1501 can be configured to communicate with any of such components over bus 1502. In another example, any of such components can be represented by program instructions stored in memory that when executed by processing circuitry 1501 perform the corresponding functions described herein. In another example, the functionality of any of such components can be partitioned between processing circuitry 1501 and communication subsystem 1531. In another example, the non-computationally intensive functions of any of such components can be implemented in software or firmware and the computationally intensive functions can be implemented in hardware.

Figure 16:
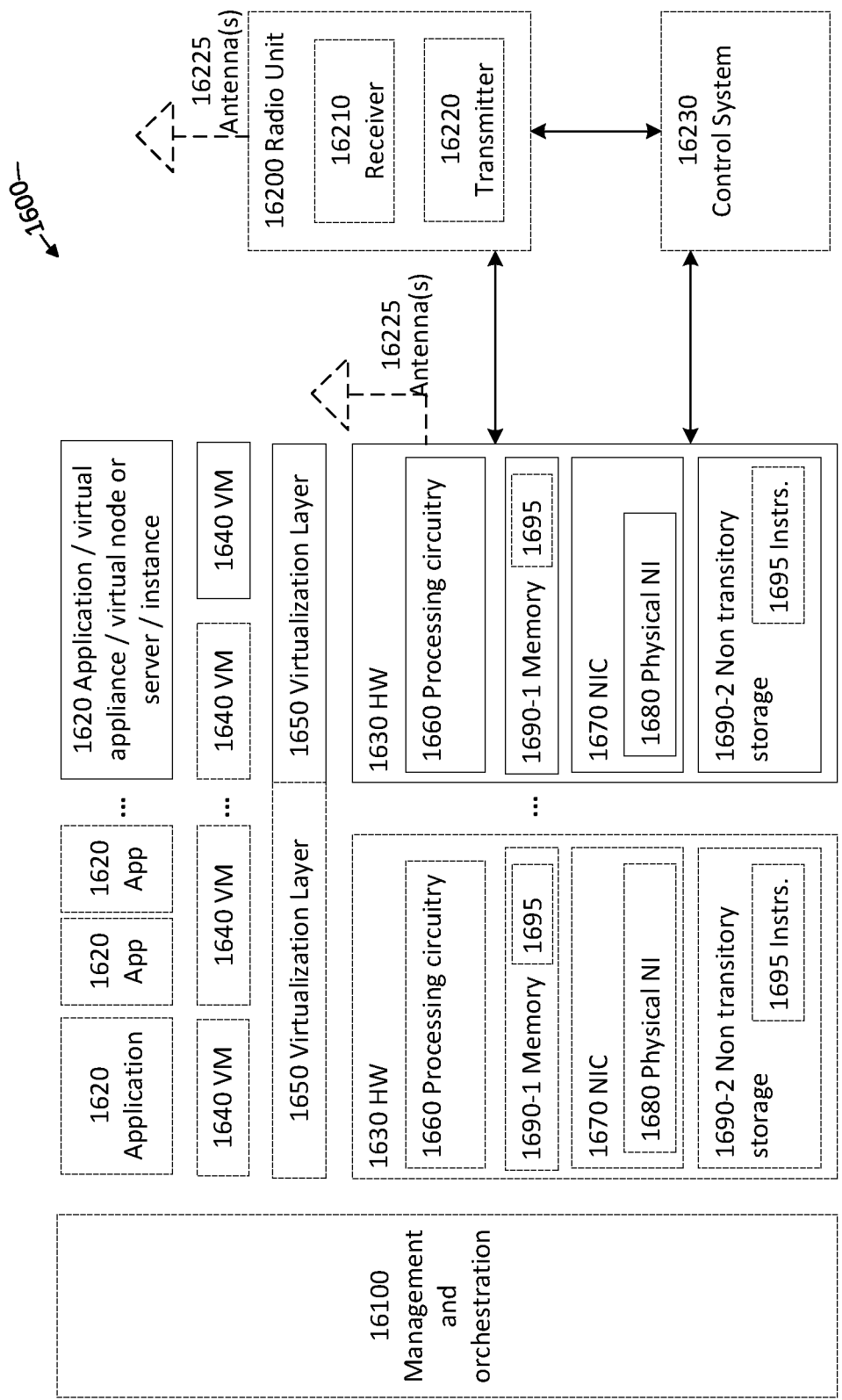
FIG. 16 is a block diagram of illustrating a virtualization environment that facilitates virtualization of various functions implemented according to exemplary embodiments of the present disclosure.

FIG. 16 is a schematic block diagram illustrating a virtualization environment 1600 in which functions implemented by some embodiments can be virtualized. In the present context, virtualizing means creating virtual versions of apparatuses or devices which can include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein can be implemented as virtual components executed by one or more virtual machines implemented in one or more virtual environments 1600 hosted by one or more of hardware nodes 1630. Further, in embodiments in which the virtual node is not a radio access node or does not require radio connectivity (e.g., a core network node), then the network node can be entirely virtualized.

The functions can be implemented by one or more applications 1620 (which can alternatively be called software instances, virtual appliances, network functions, virtual nodes, virtual network functions, etc.) operative to implement some of the features, functions, and/or benefits of some of the embodiments disclosed herein. Applications 1620 are run in virtualization environment 1600 which provides hardware 1630 comprising processing circuitry 1660 and memory 1690. Memory 1690 contains instructions 1695 executable by processing circuitry 1660 whereby application 1620 is operative to provide one or more of the features, benefits, and/or functions disclosed herein.

Virtualization environment 1600, comprises general-purpose or special-purpose network hardware devices 1630 comprising a set of one or more processors or processing circuitry 1660, which can be commercial off-the-shelf (COTS) processors, dedicated Application Specific Integrated Circuits (ASICs), or any other type of processing circuitry including digital or analog hardware components or special purpose processors. Each hardware device can comprise memory 1690-1 which can be non-persistent memory for temporarily storing instructions 1695 or software executed by processing circuitry 1660. Each hardware device can comprise one or more network interface controllers (NICs) 1670, also known as network interface cards, which include physical network interface 1680. Each hardware device can also include non-transitory, persistent, machine-readable storage media 1690-2 having stored therein software 1695 and/or instructions executable by processing circuitry 1660. Software 1695 can include any type of software including software for instantiating one or more virtualization layers 1650 (also referred to as hypervisors), software to execute virtual machines 1640 as well as software allowing it to execute functions, features and/or benefits described in relation with some embodiments described herein.

Virtual machines 1640, comprise virtual processing, virtual memory, virtual networking or interface and virtual storage, and can be run by a corresponding virtualization layer 1650 or hypervisor. Different embodiments of the instance of virtual appliance 1620 can be implemented on one or more of virtual machines 1640, and the implementations can be made in different ways.

During operation, processing circuitry 1660 executes software 1695 to instantiate the hypervisor or virtualization layer 1650, which can sometimes be referred to as a virtual machine monitor (VMM). Virtualization layer 1650 can present a virtual operating platform that appears like networking hardware to virtual machine 1640.

As shown in FIG. 16, hardware 1630 can be a standalone network node with generic or specific components. Hardware 1630 can comprise antenna 16225 and can implement some functions via virtualization. Alternatively, hardware 1630 can be part of a larger cluster of hardware (e.g. such as in a data center or customer premise equipment (CPE)) where many hardware nodes work together and are managed via management and orchestration (MANO) 16100, which, among others, oversees lifecycle management of applications 1620.

Virtualization of the hardware is in some contexts referred to as network function virtualization (NFV). NFV can be used to consolidate many network equipment types onto industry standard high volume server hardware, physical switches, and physical storage, which can be located in data centers, and customer premise equipment.

In the context of NFV, virtual machine 1640 can be a software implementation of a physical machine that runs programs as if they were executing on a physical, non-virtualized machine. Each of virtual machines 1640, and that part of hardware 1630 that executes that virtual machine, be it hardware dedicated to that virtual machine and/or hardware shared by that virtual machine with others of the virtual machines 1640, forms a separate virtual network elements (VNE).

Still in the context of NFV, Virtual Network Function (VNF) is responsible for handling specific network functions that run in one or more virtual machines 1640 on top of hardware networking infrastructure 1630 and corresponds to application 1620 in FIG. 16.

In some embodiments, one or more radio units 16200 that each include one or more transmitters 16220 and one or more receivers 16210 can be coupled to one or more antennas 16225. Radio units 16200 can communicate directly with hardware nodes 1630 via one or more appropriate network interfaces and can be used in combination with the virtual components to provide a virtual node with radio capabilities, such as a radio access node or a base station.

In some embodiments, some signalling can be effected with the use of control system 16230 which can alternatively be used for communication between the hardware nodes 1630 and radio units 16200.

Figure 8:
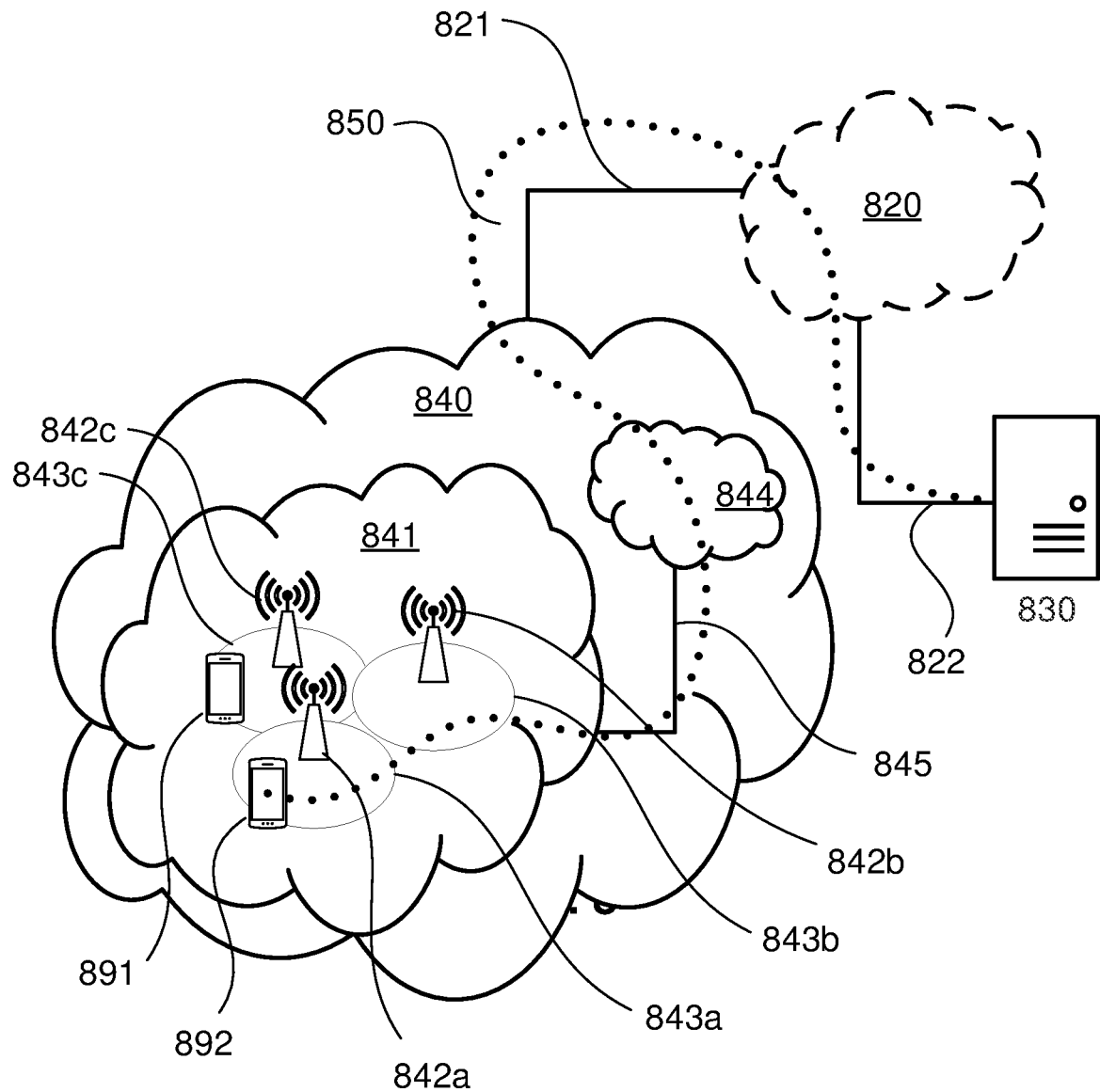
FIGS. 8-9 are block diagrams of exemplary communication systems configurable according to various exemplary embodiments of the present disclosure.

FIG. 8 shows an exemplary communication system in accordance with various embodiments of the present disclosure. The system includes a telecommunication network 840, such as a 3GPP-type cellular network, which comprises an access network 841, such as a E-UTRAN and/or a gNB-RAN, and a core network 844 (e.g., EPC or 5GC). The access network 841 comprises a plurality of base stations 842a, 842b, 842c, such as eNBs, gNBs or other types of wireless access points, each defining a corresponding coverage area 843a, 843b, 843c. Each base station 842a, 842b, 842c is connectable to the core network 844 over a wired or wireless connection 845. A first user equipment (UE) 891 located in coverage area 843c is configured to wirelessly connect to, or be paged by, the corresponding base station 842c. A second UE 892 in coverage area 843a is wirelessly connectable to the corresponding base station 842a. While a plurality of UEs 891, 892 are illustrated in this example, the disclosed embodiments are equally applicable to a situation where a sole UE is in the coverage area or where a sole UE is connecting to the corresponding base station 842.

The telecommunication network 840 can be connected to a host computer 830, which can be embodied in the hardware and/or software of a standalone server, a cloud-implemented server, a distributed server or as processing resources in a server farm. The host computer 830 can be under the ownership or control of a service provider, or can be operated by the service provider or on behalf of the service provider. The connections 821, 822 between the telecommunication network 840 and the host computer 830 can extend directly from the core network 844 to the host computer 830 or can go via an optional intermediate network 820. The intermediate network 820 can be one of, or a combination of more than one of, a public, private or hosted network; the intermediate network 820, if any, can be a backbone network or the Internet; in particular, the intermediate network 820 can comprise two or more sub-networks (not shown).

The communication system of FIG. 8 as a whole enables connectivity between one of the connected UEs 891, 892 and the host computer 830. The connectivity can be described as an over-the-top (OTT) connection 850. The host computer 830 and the connected UEs 891, 892 are configured to communicate data and/or signaling via the OTT connection 850, using the access network 841, the core network 844, any intermediate network 820 and possible further infrastructure (not shown) as intermediaries. The OTT connection 850 can be transparent in the sense that the participating communication devices through which the OTT connection 850 passes are unaware of routing of uplink and downlink communications. For example, a base station 842 can not or need not be informed about the past routing of an incoming downlink communication with data originating from a host computer 830 to be forwarded (e.g., handed over) to a connected UE 891. Similarly, the base station 842 need not be aware of the future routing of an outgoing uplink communication originating from the UE 891 towards the host computer 830.

Example implementations, in accordance with an embodiment, of the UE, base station and host computer discussed in the preceding paragraphs will now be described with reference to FIG. 9. In a communication system 900, a host computer 910 comprises hardware 915 including a communication interface 916 configured to set up and maintain a wired or wireless connection with an interface of a different communication device of the communication system 900. The host computer 910 further comprises processing circuitry 919, which can have storage and/or processing capabilities. In particular, the processing circuitry 919 can comprise one or more programmable processors, application-specific integrated circuits, field programmable gate arrays or combinations of these (not shown) adapted to execute instructions.

The host computer 910 further comprises software 911, which is stored in or accessible by the host computer 910 and executable by the processing circuitry 919. The software 911 includes a host application 912. The host application 912 can be operable to provide a service to a remote user, such as a UE 930 connecting via an OTT connection 950 terminating at the UE 930 and the host computer 910. In providing the service to the remote user, the host application 912 can provide user data which is transmitted using the OTT connection 950.

The communication system 900 further includes a base station 920 provided in a telecommunication system and comprising hardware 925 enabling it to communicate with the host computer 910 and with the UE 930. The hardware 925 can include a communication interface 926 for setting up and maintaining a wired or wireless connection with an interface of a different communication device of the communication system 900, as well as a radio interface 927 for setting up and maintaining at least wireless connection 970 with the UE 930 located in a coverage area (not shown in FIG. 9) served by the base station 920. The communication interface 926 can be configured to facilitate a connection 960 to the host computer 910. The connection 960 can be direct or it can pass through a core network (not shown in FIG. 9) of the telecommunication system and/or through one or more intermediate networks outside the telecommunication system. In the embodiment shown, the hardware 925 of the base station 920 further includes processing circuitry 929, which can comprise one or more programmable processors, application-specific integrated circuits, field programmable gate arrays or combinations of these (not shown) adapted to execute instructions. The base station 920 further has software 921 stored internally or accessible via an external connection.

The communication system 900 further includes the UE 930 already referred to. Its hardware 935 can include a radio interface 937 configured to set up and maintain a wireless connection 970 with a base station serving a coverage area in which the UE 930 is currently located. The hardware 935 of the UE 930 further includes processing circuitry 939, which can comprise one or more programmable processors, application-specific integrated circuits, field programmable gate arrays or combinations of these (not shown) adapted to execute instructions. The UE 930 further comprises software 931, which is stored in or accessible by the UE 930 and executable by the processing circuitry 939. The software 931 includes a client application 932. The client application 932 can be operable to provide a service to a human or non-human user via the UE 930, with the support of the host computer 910. In the host computer 910, an executing host application 912 can communicate with the executing client application 932 via the OTT connection 950 terminating at the UE 930 and the host computer 910. In providing the service to the user, the client application 932 can receive request data from the host application 912 and provide user data in response to the request data. The OTT connection 950 can transfer both the request data and the user data. The client application 932 can interact with the user to generate the user data that it provides.

Figure 9:
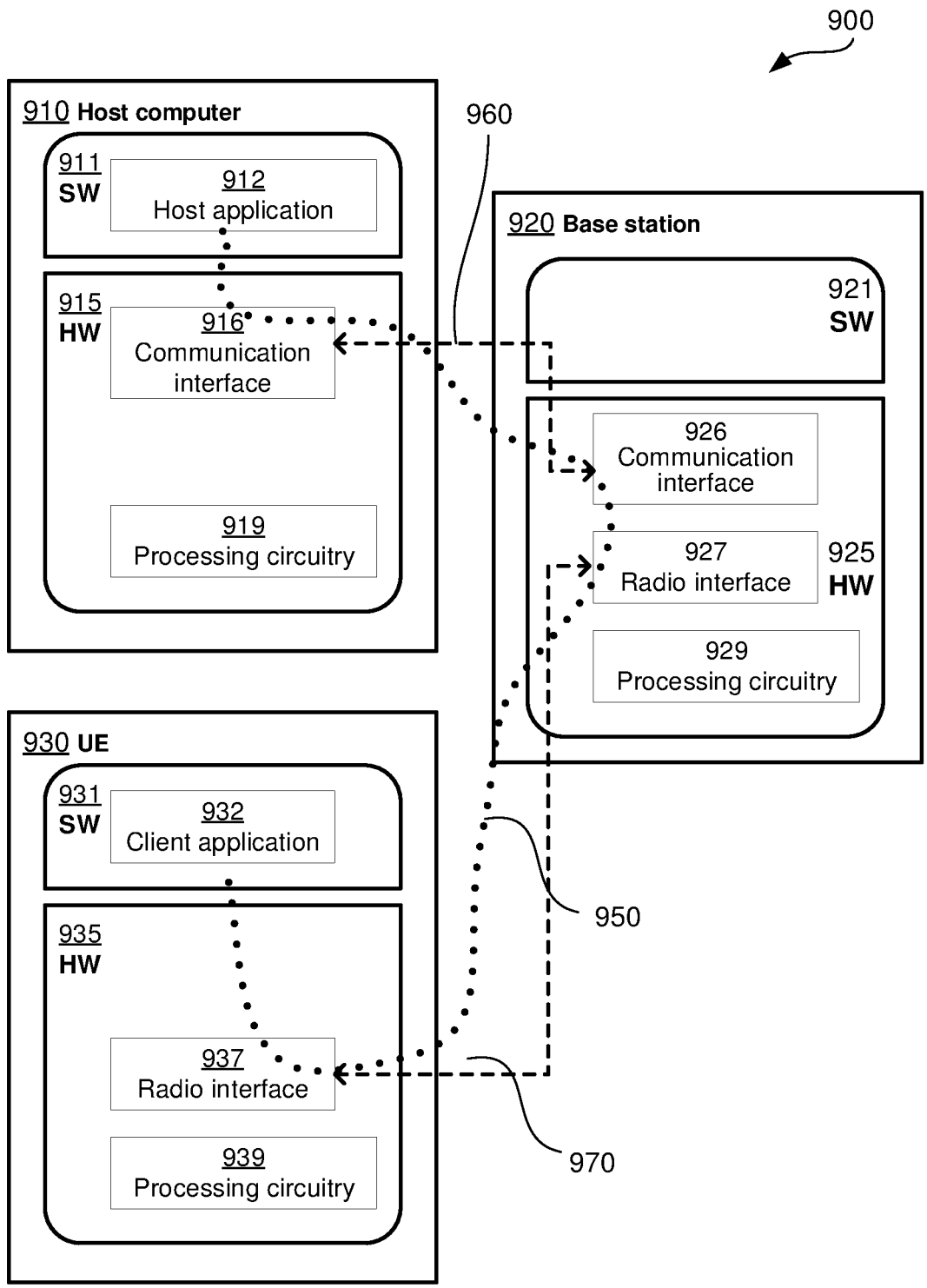

It is noted that the host computer 910, base station 920 and UE 930 illustrated in FIG. 9 can be identical to the host computer 830, one of the base stations 812a, 812b, 812c and one of the UEs 891, 892 of FIG. 8, respectively. This is to say, the inner workings of these entities can be as shown in FIG. 9 and independently, the surrounding network topology can be that of FIG. 8.

In FIG. 9, the OTT connection 950 has been drawn abstractly to illustrate the communication between the host computer 910 and the UE 930 via the base station 920, without explicit reference to any intermediary devices and the precise routing of messages via these devices. Network infrastructure can determine the routing, which it can be configured to hide from the UE 930 or from the service provider operating the host computer 910, or both. While the OTT connection 950 is active, the network infrastructure can further make decisions by which it dynamically changes the routing (e.g., on the basis of load balancing consideration or reconfiguration of the network).

The wireless connection 970 between the UE 930 and the base station 920 is in accordance with the teachings of the embodiments described throughout this disclosure. One or more of the various embodiments improve the performance of OTT services provided to the UE 930 using the OTT connection 950, in which the wireless connection 970 forms the last segment. More precisely, the exemplary embodiments disclosed herein can improve flexibility for the network to monitor end-to-end quality-of-service (QoS) of data flows, including their corresponding radio bearers, associated with data sessions between a user equipment (UE) and another entity, such as an OTT data application or service external to the 5G network. These and other advantages can facilitate more timely design, implementation, and deployment of 5G/NR solutions. Furthermore, such embodiments can facilitate flexible and timely control of data session QoS, which can lead to improvements in capacity, throughput, latency, etc. that are envisioned by 5G/NR and important for the growth of OTT services.

A measurement procedure can be provided for the purpose of monitoring data rate, latency and other factors on which the one or more embodiments improve. There can further be an optional network functionality for reconfiguring the OTT connection 950 between the host computer 910 and UE 930, in response to variations in the measurement results. The measurement procedure and/or the network functionality for reconfiguring the OTT connection 950 can be implemented in the software 911 of the host computer 910 or in the software 931 of the UE 930, or both. In embodiments, sensors (not shown) can be deployed in or in association with communication devices through which the OTT connection 950 passes; the sensors can participate in the measurement procedure by supplying values of the monitored quantities exemplified above, or supplying values of other physical quantities from which software 911, 931 can compute or estimate the monitored quantities. The reconfiguring of the OTT connection 950 can include message format, retransmission settings, preferred routing etc.; the reconfiguring need not affect the base station 920, and it can be unknown or imperceptible to the base station 920. Such procedures and functionalities can be known and practiced in the art. In certain embodiments, measurements can involve proprietary UE signaling facilitating the host computer's 910 measurements of throughput, propagation times, latency and the like. The measurements can be implemented in that the software 911, 931 causes messages to be transmitted, in particular empty or 'dummy' messages, using the OTT connection 950 while it monitors propagation times, errors etc.

FIG. 10 is a flowchart illustrating a method implemented in a communication system, in accordance with one embodiment. The communication system includes a host computer, a base station and a UE which may be those described with reference to FIGS. 8-9 and 14-16. For simplicity of the present disclosure, only drawing references to FIG. 10 will be included in this section. In a first operation 1000 of the method, the host computer provides user data. In an optional sub-operation 1002 of the first operation 1000, the host computer provides the user data by executing a host application. In a second operation 1004, the host computer initiates a transmission carrying the user data to the UE. In an optional third operation 1006, the base station transmits to the UE the user data which was carried in the transmission that the host computer initiated, in accordance with the teachings of the embodiments described throughout this disclosure. In an optional fourth operation 1008, the UE executes a client application associated with the host application executed by the host computer.

FIG. 11 is a flowchart illustrating a method implemented in a communication system, in accordance with one embodiment. The communication system includes a host computer, a base station and a UE which may be those described with reference to FIGS. 8-9 and 14-16. For simplicity of the present disclosure, only drawing references to FIG. 10 will be included in this section. In a first operation 1100 of the method, the host computer provides user data. In an optional sub-operation (not shown), the host computer provides the user data by executing a host application. In a second operation 1102, the host computer initiates a transmission carrying the user data to the UE. The transmission may pass via the base station, in accordance with the teachings of the embodiments described throughout this disclosure. In an optional third operation 1104, the UE receives the user data carried in the transmission.

FIG. 12 is a flowchart illustrating a method implemented in a communication system, in accordance with one embodiment. The communication system includes a host computer, a base station and a UE which may be those described with reference to FIGS. 8-9 and 14-16. For simplicity of the present disclosure, only drawing references to FIG. 12 will be included in this section. In an optional first operation 1200 of the method, the UE receives input data provided by the host computer. Additionally or alternatively, in an optional second operation 1202, the UE provides user data. In an optional sub-operation 1206 of the second operation 1202, the UE provides the user data by executing a client application. In a further optional sub-operation 1204 of the first operation 1200, the UE executes a client application which provides the user data in reaction to the received input data provided by the host computer. In providing the user data, the executed client application may further consider user input received from the user. Regardless of the specific manner in which the user data was provided, the UE initiates, in an optional third sub-operation 1208, transmission of the user data to the host computer. In a fourth operation 1210 of the method, the host computer receives the user data transmitted from the UE, in accordance with the teachings of the embodiments described throughout this disclosure.

FIG. 13 is a flowchart illustrating a method implemented in a communication system, in accordance with one embodiment. The communication system includes a host computer, a base station and a UE which may be those described with reference to FIGS. 8-9 and 14-16. For simplicity of the present disclosure, only drawing references to FIG. 13 will be included in this section. In an optional first operation 1300 of the method, in accordance with the teachings of the embodiments described throughout this disclosure, the base station receives user data from the UE. In an optional second operation 1302, the base station initiates transmission of the received user data to the host computer. In a third operation 1304, the host computer receives the user data carried in the transmission initiated by the base station.

Figure 17:
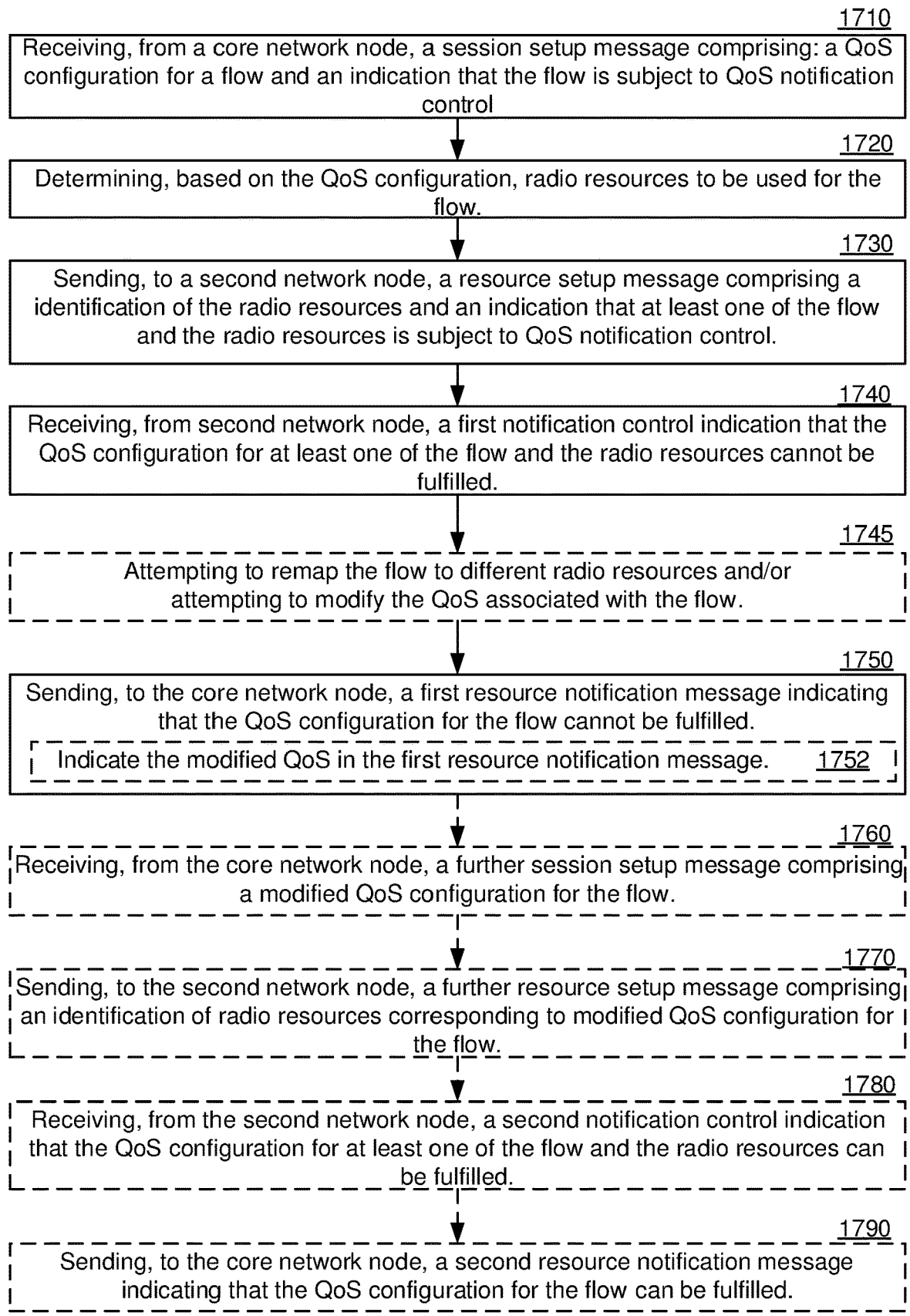
FIG. 17 is a flow diagram illustrating exemplary methods and/or procedures performed by a first network node (e.g., gNB-CU or MgNB), according to various exemplary embodiments of the present disclosure.
Figure 18:
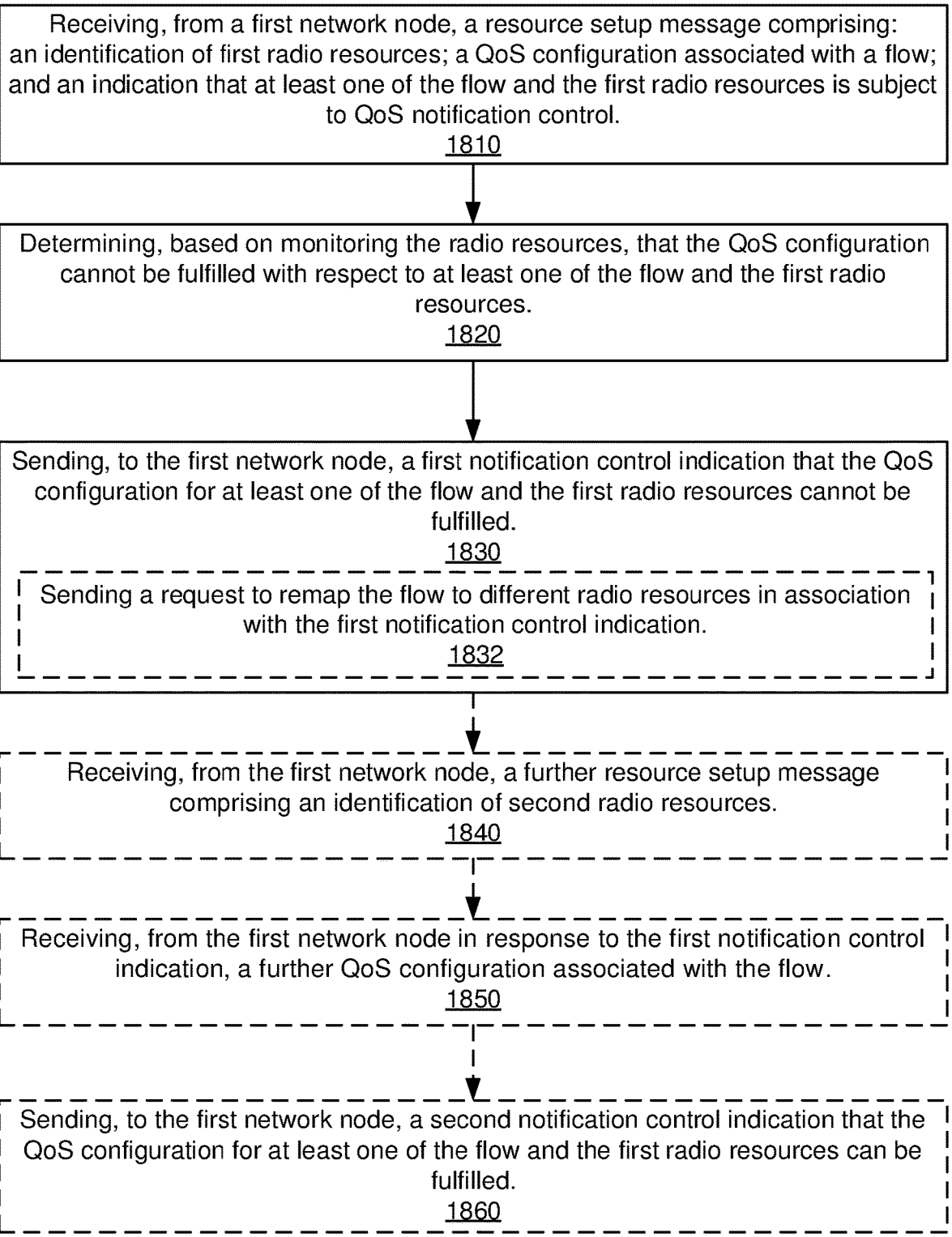
FIG. 18 is a flow diagram illustrating exemplary methods and/or procedures performed by a second network node (e.g., gNB-DU or SgNB), according to various exemplary embodiments of the present disclosure.

FIG. 17 illustrates an exemplary method and/or procedure performed in a first network node (e.g., gNB-CU or MgNB), in accordance with particular exemplary embodiments of the present disclosure. Although the exemplary method and/or procedure is illustrated in FIG. 17 by blocks in a particular order, this order is exemplary and the operations corresponding to the blocks can be performed in different orders, and can be combined and/or divided into blocks having different functionality than shown in FIG. 17. Furthermore, exemplary method and/or procedure shown in FIG. 17 can be complimentary to exemplary method and/or procedure illustrated in FIGS. 18 and 19 below. In other words, exemplary methods and/or procedures shown in FIGS. 17-19 are capable of being used cooperatively to provide the benefits, advantages, and/or solutions to problems described hereinabove. The exemplary method and/or procedure begins at block 1710 where the first network node receives, from a core network node, a session setup message comprising a QoS configuration for the flow and an indication that the flow is subject to QoS notification control. In block 1720, the first network node determines, based on the QoS configuration, radio resources to be used for the flow. In block 1730, the first network node sends, to a second network node, a resource setup message comprising an identification of the radio resources and an indication that at least one of the flow and the radio resources is subject to QoS notification control. In block 1740, the first network node receives, from the second network node, a first notification control indication that the QoS configuration for at least one of the flow and the radio resources cannot be fulfilled. In block 1750, the first network node sends, to the core network node, a first resource notification message indicating that the QoS configuration for the flow cannot be fulfilled.

In some embodiments, the exemplary method and/or procedure can further include the first network node receiving, from the second network node, a second notification control indication that the QoS configuration for at least one of the flow and the radio resources can be fulfilled (block 1780); and sending, to the core network node, a second resource notification message indicating that the QoS configuration for the flow can be fulfilled (block 1790). In some exemplary embodiments, the first notification control indication further comprises a request to remap the flow to different radio resources, and the first network node can attempt to remap the flow to different radio resources prior to sending the first resource notification message (block 1745).

In some embodiments, the exemplary method and/or procedure can further include, after receiving the first notification control indication, the first network node attempting to modify the QoS associated with the flow (block 1745); and if attempting to modify the QoS associated with the flow is successful, the first network node indicates the modified QoS in the first resource notification message (block 1752). In some exemplary embodiments, the resource setup message further comprises at least one of a time period and an amount pertaining to a determination that the QoS configuration for at least one of the flow and the radio resources cannot be fulfilled.

In some embodiments, the exemplary method and/or procedure can further include receiving, from the core network node, a further session setup message comprising a modified QoS configuration for the flow (block 1760); and sending, to the second network node, a further resource setup message comprising an identification of the radio resources corresponding to the modified QoS configuration for the flow (block 1770). In some exemplary embodiments, the first network node can be a central unit (CU) and the second network node can be a distributed unit (DU), and the radio resources can comprise a data radio bearer (DRB) associated with the DU. In some exemplary embodiments, the first network node can be a master node (MN) and the second network node can be a secondary node (SN), and the identification of the radio resources can comprise a request to offload a data radio bearer (DRB) associated with the flow to the SN.

FIG. 18 below illustrates an exemplary method and/or procedure performed in a second network node (e.g., gNB-DU or SgNB), in accordance with particular exemplary embodiments of the present disclosure. Although the exemplary method and/or procedure is illustrated in FIG. 18 by blocks in a particular order, this order is exemplary and the operations corresponding to the blocks can be performed in different orders, and can be combined and/or divided into blocks having different functionality than shown in FIG. 18. Furthermore, exemplary method and/or procedure shown in FIG. 18 can be complimentary to exemplary method and/or procedure illustrated in FIG. 17 above and FIG. 19 below. In other words, exemplary methods and/or procedures shown in FIGS. 17-19 are capable of being used cooperatively to provide the benefits, advantages, and/or solutions to problems described hereinabove.

The exemplary method and/or procedure begins at block 1810 where the second network node receives, from a first network node, a resource setup message comprising: an identification of first radio resources; a QoS configuration associated with the flow; and an indication that at least one of the flow and the first radio resources is subject to QoS notification control. In block 1820, the second network node determines, based on monitoring the radio resources, that the QoS configuration cannot be fulfilled with respect to at least one of the flow and the first radio resources. In block 1830, the second network node sends, to the first network node, a first notification control indication that the QoS configuration for at least one of the flow and the first radio resources cannot be fulfilled.

In some embodiments, the exemplary method and/or procedure can also include the second network node sending, to the first network node, a second notification control indication that the QoS configuration for at least one of the flow and the first radio resources can be fulfilled (block 1860). In some embodiments, the exemplary method and/or procedure can also include the second network node sending, to the first network node in association with the first notification control indication, a request to remap the flow to different radio resources (block 1832); and receiving, from the first network node, a further resource setup message comprising an identification of second radio resources (block 1840). In some exemplary embodiments, the request to remap the flow to different resources comprises an identification of particular resources.

In some embodiments, the exemplary method and/or procedure can also include the second network node receiving, from the first network node in response to the first notification control indication, a further QoS configuration associated with the flow (block 1850). In some exemplary embodiments, the resource setup message further comprises at least one of a time period and an amount, and the determination that the QoS configuration for at least one of the flow and the first radio resources cannot be fulfilled, is based on the at least one of the time period and the amount. In some exemplary embodiments, the first network node can be a central unit (CU) and the second network node can be a distributed unit (DU), and the radio resources can comprise a data radio bearer (DRB) associated with the DU. In some exemplary embodiments, the first network node can be a master node (MN) and the second network node can be a secondary node (SN), and the identification of the radio resources can comprise a request to offload a data radio bearer (DRB) associated with the flow to the SN.

FIG. 19 below illustrates an exemplary method and/or procedure performed in a core network node, in accordance with particular exemplary embodiments of the present disclosure. Although the exemplary method and/or procedure is illustrated in FIG. 19 by blocks in a particular order, this order is exemplary and the operations corresponding to the blocks can be performed in different orders, and can be combined and/or divided into blocks having different functionality than shown in FIG. 19. Furthermore, exemplary method and/or procedure shown in FIG. 19 can be complimentary to exemplary methods and/or procedures illustrated in FIGS. 17 and 18 above. In other words, exemplary methods and/or procedures shown in FIGS. 17-19 are capable of being used cooperatively to provide the benefits, advantages, and/or solutions to problems described hereinabove.

The exemplary method and/or procedure begins at block 1910 where the core network node sends, to a first network node, a session setup message comprising a QoS configuration for the flow, and an indication that the flow is subject to QoS notification control. In block 1920, the core network node receives, from the first network node, a first resource notification message indicating that the QoS configuration for the flow cannot be fulfilled. In block 1930, the core network node determines, based on the first resource notification message, whether to maintain, remove, or modify the flow.

In some embodiments, the exemplary method and/or procedure can also include the core network node receiving, from the first network node, a second resource notification message indicating that the QoS configuration for the flow can be fulfilled (block 1940). In some exemplary embodiments, the second resource notification message further comprises an indication that the first network node modified the QoS associated with the flow. In some embodiments, the exemplary method and/or procedure can also include the core network node sending, to the first network node, a further session setup message comprising a modified QoS configuration for the flow (block 1950).

The term unit can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

As used herein unless expressly stated to the contrary, the phrases "at least one of" and "one or more of," followed by a conjunctive list of enumerated items (e.g., "A and B", "A, B, and C"), are intended to mean "at least one item, with each item selected from the list consisting of" the enumerated items. For example, "at least one of A and B" is intended to mean any of the following: A; B; or A and B. Likewise, "one or more of A, B, and C" is intended to mean any of the following: A; B; C; A and B; B and C; A and C; or A, B, and C.

As used herein unless expressly stated to the contrary, the phrase "a plurality of" followed by a conjunctive list of enumerated items (e.g., "A and B", "A, B, and C") is intended to mean "multiple items, with each item selected from the list consisting of" the enumerated items. For example, "a plurality of A and B" is intended to mean any of the following: more than one A; more than one B; or at least one A and at least one B.

Some Exemplary Embodiments

1. A method performed by a first network node for monitoring the quality-of-service (QoS) of a flow comprising a data session with a user equipment (UE), the method comprising:
   receiving, from a core network node, a session setup message comprising a QoS configuration for the flow and an indication that the flow is subject to QoS notification control;
   determining, based on the QoS configuration, radio resources to be used for the flow;
   sending, to a second network node, a resource setup message comprising a identification of the radio resources and an indication that at least one of the flow and the radio resources is subject to QoS notification control;
   receiving, from the second network node, a first notification control indication that the QoS configuration for at least one of the flow and the radio resources cannot be fulfilled; and
   sending, to the core network node, a first resource notification message indicating that the QoS configuration for the flow cannot be fulfilled.
2. The method of embodiment 1, further comprising:
   receiving, from the second network node, a second notification control indication that the QoS configuration for at least one of the flow and the radio resources can be fulfilled; and
   sending, to the core network node, a second resource notification message indicating that the QoS configuration for the flow can be fulfilled.

3. The method of embodiments 1 or 2, wherein:
   the first notification control indication further comprises a request to remap the flow to different radio resources; and
   the first network node attempts to remap the flow to different radio resources prior to sending the first resource notification message.
4. The method of any of embodiments 1-3, wherein:
   after receiving the first notification control indication, the first network node attempts to modify the QoS associated with the flow; and
   if the first network node successfully modifies the QoS associated with the flow, the first network node indicates the modified QoS in the first resource notification message.
5. The method of any of embodiments 1-4, wherein the resource setup message further comprises at least one of a time period and an amount pertaining to a determination that the QoS configuration for at least one of the flow and the radio resources cannot be fulfilled
6. The method of any of embodiments 1-5, further comprising:
   receiving, from the core network node, a further session setup message comprising a modified QoS configuration for the flow; and
   sending, to the second network node, a further resource setup message comprising an identification of the radio resources corresponding to the modified QoS configuration for the flow.
7. The method of any of embodiments 1-6, wherein the first network node is a central unit (CU) (620) and the second network node is a distributed unit (DU) (610), and the radio resources comprise a data radio bearer (DRB) associated with the DU.
8. The method of any of embodiments 1-6, wherein the first network node is a master node (MN) (720) and the second network node is a secondary node (SN) (710), and the identification of the radio resources comprises a request to offload a data radio bearer (DRB) associated with the flow to the SN.
9. A method performed by a second network node for monitoring the quality-of-service (QoS) of a flow comprising a data session with a user equipment (UE), the method comprising:
   receiving, from a first network node, a resource setup message comprising an identification of first radio resources and a QoS configuration associated with the flow, and an indication that at least one of the flow and the first radio resources is subject to QoS notification control;
   determining, based on monitoring the radio resources, that the QoS configuration cannot be fulfilled with respect to at least one of the flow and the first radio resources; and
   sending, to the first network node, a first notification control indication that the QoS configuration for at least one of the flow and the first radio resources cannot be fulfilled.
10. The method of embodiment 9, further comprising sending, to the second network node, a second notification control indication that the QoS configuration for at least one of the flow and the first radio resources can be fulfilled
11. The method of embodiments 9 or 10, further comprising:
    sending, to the first network node in association with the first notification control indication, a request to remap the flow to different radio resources; and receiving, from the first network node, a further resource setup message comprising an identification of second radio resources.
12. The method of embodiment 11, wherein the request to remap the flow to different resources comprises an identification of particular resources.
13. The method of any of embodiments 9-12, further comprising receiving, from the first network node in response to the first notification control indication, a further QoS configuration associated with the flow.
14. The method of any of embodiments 9-13, wherein the resource setup message further comprises at least one of a time period and an amount, and wherein the determination that the QoS configuration for at least one of the flow and the first radio resources cannot be fulfilled, is based on the at least one of the time period and the amount.
15. The method of any of embodiments 9-14, wherein the first network node is a central unit (CU) (620) and the second network node is a distributed unit (DU) (610), and the first radio resources comprise a data radio bearer (DRB) associated with the DU.
16. The method of any of embodiments 9-14, wherein the first network node is a master node (MN) (720) and the second network node is a secondary node (SN) (710), and the identification of the first radio resources comprises a request to offload a data radio bearer (DRB) associated with the flow to the SN.
17. A method performed by a core network node for monitoring the quality-of-service (QoS) of a flow comprising a data session with a user equipment (UE), the method comprising:
sending, to a first network node, a session setup message comprising a QoS configuration for the flow and an indication that the flow is subject to QoS notification control;
receiving, from the first network node, a first resource notification message indicating that the QoS configuration for the flow cannot be fulfilled; and
determining, based on the first resource notification message, whether to maintain, remove, or modify the flow.
18. The method of embodiment 17, further comprising receiving, from the first network node, a second resource notification message indicating that the QoS configuration for the flow can be fulfilled.
19. The method of embodiments 17 or 18, wherein the first notification message further comprises an indication that the fir st network node modified the QoS associated with the flow.
20. The method of any of embodiments 17-19, further comprising sending, to the first network node, a further session setup message comprising a modified QoS configuration for the flow.
21. A first network node comprising:
processing circuitry configured to perform operations corresponding to any of the methods of embodiments 1-8; and
power supply circuitry configured to supply power to the first network node.
22. A second network node comprising:
processing circuitry configured to perform operations corresponding to any of the methods of embodiments 9-16; and
power supply circuitry configured to supply power to the second network node.

23. A core network node comprising:
processing circuitry configured to perform operations corresponding to any of the methods of embodiments 17-20;
power supply circuitry configured to supply power to the core network node.
24. A communication system including a host computer comprising:
processing circuitry configured to provide user data; and
a communication interface configured to forward the user data to a cellular network for transmission to a user equipment (UE),
wherein the cellular network comprises first and second network nodes, at least one of the first and second network nodes having a radio interface, and both first and second network nodes having processing circuitry;
the first network node's processing circuitry is configured to perform operations corresponding to any of the methods of embodiments 1-8; and
the second network node's processing circuitry is configured to perform operations corresponding to any of the methods of embodiments 9-16.
25. The communication system of embodiment 24, further including a user equipment configured to communicate with at least one of the first and second network nodes.
26. The communication system of any of embodiments 24-25, wherein:
the processing circuitry of the host computer is configured to execute a host application, thereby providing the user data; and
the UE comprises processing circuitry configured to execute a client application associated with the host application.
27. The communication system of any of embodiments 24-26, further comprising a core network node configured to perform operations corresponding to any of the methods of embodiments 17-20.
28. A method implemented in a communication system including a host computer, first and second network nodes, and a user equipment (UE), the method comprising:
at the host computer, providing user data;
at the host computer, initiating a transmission carrying the user data to the UE via a cellular network comprising first and second network nodes;
operations, performed by a first network node, corresponding to any of the methods of embodiments 1-8; and
operations, performed by a second network node, corresponding to any of the methods of embodiments 9-16.
29. The method of embodiment 28, further comprising, transmitting the user data by at least one of the first and second network nodes.
30. The method of any of embodiments 28-29, wherein the user data is provided at the host computer by executing a host application, the method further comprising, at the UE, executing a client application associated with the host application.
31. The method system of any of embodiments 28-30, further comprising operations, performed by a core network node, corresponding to any of the methods of embodiments 17-20.
32. A communication system including a host computer comprising a communication interface configured to receive user data originating from a transmission from a user equipment (UE) to at least one of a first network node and a second network node, wherein at least one of the first and second network nodes comprises a radio interface, and wherein the first network node comprises processing circuitry configured to perform operations corresponding to any of the methods of embodiments 1-8, and wherein the second network node comprises processing circuitry configured to perform operations corresponding to any of the methods of embodiments 9-16.

33. The communication system of the previous embodiment further including the first and second network nodes.

34. The communication system of embodiments 32 or 33, further including a core network node comprising processing circuitry configured to perform operations corresponding to any of the methods of embodiments 17-20.

35. The communication system of any of embodiments 32-34, further including the UE, wherein the UE is configured to communicate with at least one of the first and second network nodes.

36. The communication system of any of embodiments 32-35, wherein:
the processing circuitry of the host computer is configured to execute a host application;
the UE is configured to execute a client application associated with the host application, thereby providing the user data to be received by the host computer.

Abbreviations

At least some of the following abbreviations can be used in this disclosure. If there is an inconsistency between abbreviations, preference should be given to how it is used above. If listed multiple times below, the first listing should be preferred over any subsequent listing(s).

1× RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
CSI-RS CSI Reference Signal
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol (or Signal) Received Power
RSRQ Reference Symbol (or Signal) Received Quality
RSSI Received Signal Strength Indicator
RSTD Reference Signal Time Difference SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSB Synchronization Signal Block
SSS Secondary Synchronization Signal
TDD Time Division Duplex
TDOA Time Difference of Arrival
TOA Time of Arrival
TSS Tertiary Synchronization Signal
TTI Transmission Time Interval
TTT Time-to-Trigger
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network
CM Cubic Metric
MIMO Multiple-input-multiple-output
MRC Maximum-ratio combining
MRT Maximum-ratio transmission
OCC Orthogonal Cover Code
PAPR Peak to Average Power Ratio
SRS Sounding Reference Signal
SPS Semi-Persistent Scheduling
URLLC Ultra-Reliable Low Latency Communication
VL-MIMO Very-large multiple-input-multiple-output
ZF Zero Forcing

What is claimed is:

1. A method, performed by a second network node, for monitoring quality-of-service (QoS) of a flow comprising a data session with a user equipment (UE), the method comprising:
receiving, from a first network node, a resource setup message comprising:
an identification of first radio resources,
a QoS configuration associated with the flow, and
an indication that at least one of the flow and the first radio resources is subject to QoS notification control;
based on monitoring the first radio resources, determining that the QoS configuration cannot be fulfilled with respect to at least one of the flow and the first radio resources; and
sending, to the first network node, a first notification control indication that the QoS configuration for at least one of the flow and the first radio resources cannot be fulfilled.

2. The method of claim 1, further comprising sending, to the first network node, a second notification control indication that the QoS configuration for at least one of the flow and the first radio resources can be fulfilled.

3. The method of claim 1, further comprising:
sending, to the first network node in association with the first notification control indication, a request to remap the flow to different radio resources; and
receiving, from the first network node, a further resource setup message comprising an identification of second radio resources.

4. The method of claim 1, wherein:
the resource setup message further comprises at least one of a time period and an amount; and
the determination that the QoS configuration, for at least one of the flow and the first radio resources, cannot be fulfilled is based on the at least one of the time period and the amount.

5. The method of claim 1, wherein:
the first network node is a central unit (CU) and the second network node is a distributed unit (DU); and
the first radio resources comprise a data radio bearer (DRB) associated with the DU.

6. The method of claim 1, wherein:
the first network node is a master node (MN) and the second network node is a secondary node (SN); and
the identification of the first radio resources comprises a request to offload a data radio bearer (DRB) associated with the flow to the SN.

7. A second network node comprising:
power supply circuitry configured to supply power to the second network node;
processing circuitry configured to:
receive, from a first network node, a resource setup message comprising:
an identification of first radio resources,
a quality-of-service (QoS) configuration associated with a flow comprising a data session with a user equipment (UE), and
an indication that at least one of the flow and the first radio resources is subject to QoS notification control;
based on monitoring the first radio resources, determine that the QoS configuration cannot be fulfilled with respect to at least one of the flow and the first radio resources; and
send, to the first network node, a first notification control indication that the QoS configuration for at least one of the flow and the first radio resources cannot be fulfilled.

8. The second network node of claim 7, wherein the processing circuitry is further configured to send, to the first network node, a second notification control indication that the QoS configuration for at least one of the flow and the first radio resources can be fulfilled.

9. The second network node of claim 7, wherein the processing circuitry is further configured to:
send, to the first network node in association with the first notification control indication, a request to remap the flow to different radio resources; and
receive, from the first network node, a further resource setup message comprising an identification of second radio resources.

10. The second network node of claim 7, wherein:
the resource setup message further comprises at least one of a time period and an amount; and
the determination that the QoS configuration, for at least one of the flow and the first radio resources, cannot be fulfilled is based on the at least one of the time period and the amount.

11. The second network node of claim 7, wherein:
the first network node is a central unit (CU) and the second network node is a distributed unit (DU); and
the first radio resources comprise a data radio bearer (DRB) associated with the DU.

12. The second network node of claim 7, wherein:
the first network node is a master node (MN) and the second network node is a secondary node (SN); and
the identification of the first radio resources comprises a request to offload a data radio bearer (DRB) associated with the flow to the SN.

13. A non-transitory, computer-readable medium storing computer-executable instructions that, when executed by processing circuitry of a network node, configure the network node to perform operations corresponding to the method of claim 1.

* * * * *